(12) United States Patent
Koum et al.

(10) Patent No.: US 10,136,272 B2
(45) Date of Patent: Nov. 20, 2018

(54) SYNTHETIC COMMUNICATION NETWORK METHOD AND SYSTEM

(71) Applicant: WhatsApp Inc., Mountain View, CA (US)

(72) Inventors: Jan Koum, Santa Clara, CA (US); Brian Acton, Mountain View, CA (US)

(73) Assignee: WhatsApp Inc., Menlo Park, CA (US)

( * ) Notice: Subject to any disclaimer, the term of this patent is extended or adjusted under 35 U.S.C. 154(b) by 0 days.

(21) Appl. No.: 15/482,984

(22) Filed: Apr. 10, 2017

(65) Prior Publication Data

US 2017/0215052 A1    Jul. 27, 2017

Related U.S. Application Data

(63) Continuation of application No. 13/559,558, filed on Jul. 26, 2012, now Pat. No. 9,628,831, which is a (Continued)

(51) Int. Cl.
*H04W 92/02* (2009.01)
*H04W 4/18* (2009.01)
(Continued)

(52) U.S. Cl.
CPC ...... *H04W 4/18* (2013.01); *H04N 21/234309* (2013.01); *H04N 21/25833* (2013.01);
(Continued)

(58) Field of Classification Search
None
See application file for complete search history.

(56) References Cited

U.S. PATENT DOCUMENTS 6,295,458 B1   9/2001  Takahashi
6,587,691 B1   7/2003  Granstam
(Continued)

OTHER PUBLICATIONS

Office Action for U.S. Appl. No. 14/531,905, dated Oct. 5, 2015, 22 pages.
(Continued)

*Primary Examiner* — Charles Appiah
*Assistant Examiner* — Frank Donado
(74) *Attorney, Agent, or Firm* — Fenwick & West LLP

(57) ABSTRACT

Methods and systems for registering a phone device on a synthetic communication network are described. One implementation receives a request to connect the phone device to a synthetic communication network that transmits messages over a data network using one or more phone numbers from a voice network. A phone number and a country code associated with the phone device to be used for communications over the synthetic network are obtained. The phone number is normalized to a standard format distinguishing the resulting normalized phone number from international phone numbers using the synthetic network. Before the phone device is registered, an association between the normalized phone number and the phone device is verified by sending a verification message addressed to the phone device that loops back to the phone device. If the phone device confirms the verification as authentic, an authorization allows the phone device to communicate over the synthetic network.

20 Claims, 18 Drawing Sheets

Related U.S. Application Data continuation-in-part of application No. 12/732,182, filed on Mar. 25, 2010, now Pat. No. 8,995,965.

(51) Int. Cl.

| | | |
|---|---|---|
| *H04N 21/2343* | (2011.01) | |
| *H04N 21/258* | (2011.01) | |
| *H04N 21/414* | (2011.01) | |
| *H04N 21/4788* | (2011.01) | |
| *H04W 4/20* | (2018.01) | |
| *H04W 88/06* | (2009.01) | |
| *H04W 88/18* | (2009.01) | |

(52) U.S. Cl.
CPC .. *H04N 21/25858* (2013.01); *H04N 21/41407* (2013.01); *H04N 21/4788* (2013.01); *H04W 4/20* (2013.01); *H04W 88/06* (2013.01); *H04W 88/181* (2013.01)

(56) References Cited

U.S. PATENT DOCUMENTS

| | | |
|---|---|---|
| 6,714,799 B1 | 3/2004 | Park et al. |
| 7,120,455 B1 | 10/2006 | Chen |
| 7,177,872 B2* | 2/2007 | Schwesig ............ G11B 27/031 |
| 7,197,324 B2 | 3/2007 | Sweeney |
| 7,260,207 B2 | 8/2007 | Marsico |
| 7,496,349 B1 | 2/2009 | Gailloux et al. |
| 7,502,339 B1 | 3/2009 | Pirkola et al. |
| 7,738,833 B2 | 6/2010 | Bettis et al. |
| 7,889,849 B2 | 2/2011 | Chatterjee et al. |
| 8,169,409 B2 | 5/2012 | Castagnet |
| 8,249,572 B2 | 8/2012 | Shanahan |
| 8,412,240 B2 | 4/2013 | Bhatt et al. |
| 8,510,661 B2* | 8/2013 | Dharmaji ............ G06F 3/0481 705/14.4 |
| 9,680,803 B2 | 6/2017 | Moshir |
| 2003/0080183 A1 | 5/2003 | Rajasekaran |
| 2003/0109272 A1 | 6/2003 | Mousseau et al. |
| 2004/0003037 A1 | 1/2004 | Fujimoto et al. |
| 2004/0156495 A1 | 8/2004 | Chava et al. |
| 2004/0193683 A1* | 9/2004 | Blumofe ............ H04L 12/1818 709/204 |
| 2004/0215723 A1 | 10/2004 | Chadha |
| 2005/0064852 A1 | 3/2005 | Baldursson |
| 2005/0086376 A1 | 4/2005 | Park |
| 2005/0102381 A1* | 5/2005 | Jiang .................... H04L 63/101 709/220 |
| 2005/0108550 A1 | 5/2005 | Stelzl |
| 2005/0157857 A1* | 7/2005 | Lockwood ........ H04L 29/12584 379/88.17 |
| 2005/0197141 A1* | 9/2005 | Jiang ................. G06F 17/30876 455/457 |
| 2006/0165060 A1 | 7/2006 | Dua |
| 2006/0224688 A1 | 10/2006 | Morris |
| 2006/0262917 A1 | 11/2006 | Marsico |
| 2006/0280166 A1 | 12/2006 | Morris |
| 2007/0082671 A1 | 4/2007 | Ferg |
| 2007/0233859 A1 | 10/2007 | Zhao et al. |
| 2007/0238472 A1 | 10/2007 | Wanless |
| 2007/0249375 A1 | 10/2007 | Zapata et al. |
| 2007/0253340 A1 | 11/2007 | Varney |
| 2007/0281607 A1 | 12/2007 | Bucher |
| 2007/0281668 A1 | 12/2007 | Fleming |
| 2008/0020707 A1 | 1/2008 | Takayama et al. |
| 2008/0020738 A1 | 1/2008 | Ho et al. |
| 2008/0090598 A1 | 4/2008 | Fanelli |
| 2008/0126145 A1 | 5/2008 | Rackley, III |
| 2008/0167083 A1 | 7/2008 | Wyld et al. |
| 2008/0182548 A1 | 7/2008 | Pattison et al. |
| 2008/0189293 A1 | 8/2008 | Strandel |
| 2008/0209213 A1 | 8/2008 | Astrand et al. |
| 2008/0248815 A1 | 10/2008 | Busch |
| 2008/0292092 A1 | 11/2008 | LaPorte et al. |
| 2008/0313083 A1* | 12/2008 | Altberg ............... G06Q 10/0637 705/50 |
| 2009/0006613 A1 | 1/2009 | Toutain et al. |
| 2009/0013087 A1* | 1/2009 | Lorch ................ H04M 1/72552 709/232 |
| 2009/0019532 A1 | 1/2009 | Jacobsen |
| 2009/0049087 A1 | 2/2009 | Cackowski |
| 2009/0104934 A1* | 4/2009 | Jeong ................. H04N 1/00132 455/556.1 |
| 2009/0106437 A1 | 4/2009 | Mostafa et al. |
| 2009/0131022 A1 | 5/2009 | Buckley et al. |
| 2009/0147778 A1 | 6/2009 | Wanless et al. |
| 2009/0186638 A1 | 7/2009 | Yim |
| 2009/0221310 A1 | 9/2009 | Chen et al. |
| 2009/0234927 A1 | 9/2009 | Buzescu |
| 2009/0275314 A1 | 11/2009 | Cotevino et al. |
| 2009/0286560 A1 | 11/2009 | Willis |
| 2009/0288114 A1 | 11/2009 | Masuda |
| 2010/0004014 A1 | 1/2010 | Coulombe |
| 2010/0094976 A1 | 4/2010 | Kanefsky et al. |
| 2010/0105358 A1 | 4/2010 | Imashimizu et al. |
| 2010/0135477 A1 | 6/2010 | Chen |
| 2010/0151891 A1 | 6/2010 | Coelho |
| 2010/0161638 A1 | 6/2010 | Macrae |
| 2010/0190478 A1* | 7/2010 | Brewer .................. H04W 4/10 455/414.1 |
| 2010/0281169 A1 | 11/2010 | Charles |
| 2010/0291904 A1* | 11/2010 | Musfeldt ............... G06F 21/604 455/414.1 |
| 2010/0331021 A1 | 12/2010 | Bushnell |
| 2011/0039584 A1 | 2/2011 | Merrett |
| 2011/0070890 A1 | 3/2011 | Wu |
| 2011/0072086 A1 | 3/2011 | Newsome et al. |
| 2011/0072099 A1 | 3/2011 | Harju et al. |
| 2011/0106910 A1 | 5/2011 | Grasset |
| 2011/0264747 A1 | 10/2011 | Mutikainen et al. |
| 2014/0040383 A1 | 2/2014 | Dura |

OTHER PUBLICATIONS

United States Office Action, U.S. Appl. No. 13/559,558, dated Oct. 1, 2014, thirty pages.

United States Office Action for U.S. Appl. No. 12/732,202, filed Dec. 18, 2014, 30 pages.

United States Advisory Action, U.S. Appl. No. 13/559,558, dated Sep. 22, 2015, three pages.

United States Office Action, U.S. Appl. No. 13/559,558, dated Jul. 28, 2016, 34 pages.

United States Office Action, U.S. Appl. No. 13/559,558, dated Nov. 19, 2015, 32 pages.

United States Office Action, U.S. Appl. No. 13/559,558, dated May 22, 2015, 32 pages.

United States Office Action, U.S. Appl. No. 12/732,182, dated Nov. 20, 2013, 19 pages.

United States Office Action, U.S. Appl. No. 12/732,182, dated Dec. 7, 2012, 17 pages.

United States Office Action, U.S. Appl. No. 12/732,182, dated Mar. 14, 2012, 14 pages.

U.S. Office Action, U.S. Appl. No. 14/925,569, dated Oct. 5, 2017, twenty pages.

United States Office Action, U.S. Appl. No. 15/582,365, dated Feb. 16, 2018, thirteen pages.

\* cited by examiner

SYNTHETIC COMMUNICATION NETWORK METHOD AND SYSTEM

CROSS-REFERENCE TO RELATED APPLICATIONS

This application is a continuation of U.S. patent application Ser. No. 13/559,558, filed Jul. 26, 2012, which is a continuation-in-part of U.S. patent application Ser. No. 12/732,182, filed Mar. 25, 2010, each of which is incorporated by reference herein for all purposes.

BACKGROUND OF THE INVENTION

Widespread use of wireless phones has made them an indispensable tool to businesses and individuals alike. Many individuals carry their wireless phone almost everywhere they go just in case they need to make a call. As a result, friends and colleagues have come to reasonably expect they can get a hold of each other almost immediately with a single phone call.

While talking on a wireless phone is generally preferred, it is sometimes not possible as one party may be busy or in a meeting. Instead of a voice conversation, people may instead use their wireless phone to type a short text message and send it to another user. The short text message is sent over a specially provisioned data channel within the voice network called Short Messaging Service (SMS). SMS addresses messages using the same phone number provisioned to the wireless phone for voice communication but sends them over the data channel on the voice network. This data channel for SMS is generally limited to 140 text characters since it relies upon unused bandwidth made available when a control channel within the voice network is idle and not occupied setting up or managing voice calls.

Operators of the voice networks discovered they could charge users an additional fee for using SMS even though it cost very little for them to implement. The voice networks effectively charge for each message sent thus making the SMS communication a source of revenue. Even higher fees apply to users who send international messages to people outside their country.

Unfortunately, SMS communication remains a relatively closed and proprietary system as it is controlled by the operators of the voice network. Little has been done to increase the features associated with SMS messaging or decrease the costs as there are no competing systems. People sending text messages generally accept the 140-character limitation for sending each transmission and the relatively costly fee structure. Despite these limitations, the popularity of SMS communication on wireless devices continues to attract new users and grow in popularity. There is a need to develop an easy to use messaging system with lower costs and more features.

Additionally, mobile devices with multimedia data capabilities have created an explosion in the creation and playback of sound, images and video. High-resolution cameras and sound recorders on these mobile devices have enabled people to capture high quality images and videos of personal events, news events and other events as they occur. For example, mobile phones are often used to take videos and pictures as they are compact and with a person wherever they may go. Because storage capacity on these mobile devices is also plentiful, there is almost no limit to the amount of multimedia data people can create and store.

Sharing multimedia data with others is also rapidly growing in popularity as mobile devices incorporate increasingly high-speed data connections and powerful processors. With sophisticated editing software on the mobile device, users can quickly compile a variety of multimedia data into presentations suitable for friends or business. And almost instantly, the user may send their multimedia presentations directly to other mobile phones thereby promoting further sharing and the exchange of multimedia data on mobile devices. Indeed, users are sharing more multimedia data directly using their mobile devices as it is no longer necessary to download data from mobile devices onto a computer and then share via email or photo sharing sites.

Despite these advances, a great deal of multimedia data remains incompatible between different mobile device platforms due to incompatible formats or other variations. In the case of smartphones and other mobile phone devices, the multimedia data formats supported on each device are often limited by the phone manufacturers specifications and design choices. Consequently, if a mobile phone device receives a video, images, audio or other multimedia data in an unsupported format, the device will not be able to decode and play it back to the user. In some cases, the mobile phone device may not even allow storing data in an unsupported data format as the multimedia data may be flagged as a potential virus or other unwelcome data-risk.

Changing the multimedia encoders or decoders on the mobile device after manufacturer can be complex and difficult to do. The mobile device manufacturer expects the user to be satisfied with the multimedia encoders or decoders provided with the mobile device and generally does not encourage changing or adding to them. Even if additional encoders or decoders are available, many users may not wish to install them if they are not supported by the manufacturer or the installation process has many complicated steps and risks damaging firmware or other portions mobile device.

SUMMARY

Aspects of the present invention provide a method and system of registering a phone device on a synthetic communication network. One implementation receives a request to connect the phone device to a synthetic communication network that transmits messages over a data network using one or more phone numbers from a voice network. Aspects of the present invention initially obtain a phone number and a corresponding country code presumed associated with the phone device to be used for communications over the synthetic communication network. Based on the country code, the phone number is normalized to a standard format that distinguishes the resulting normalized phone number from international phone numbers using the synthetic communication network. Before the phone device is registered, aspects of the present invention verify an association between the normalized phone number and the phone device by sending a verification message addressed to the phone device that loops back and returns to the phone device. If the phone device confirms the verification as authentic then an authorization from the synthetic communication network allows the phone device to communicate over the synthetic communication network.

Yet another aspect of the present invention concerns normalizing a phone number to be used on a data network with phone numbers from one or more different countries. In one implementation, the normalization operation receives a default country code and phone number to be transformed into a normalized phone number. Aspects of the present invention will add an international dialing prefix to the phone number when the default country code is included in the phone number. Alternatively, aspects of the present invention may add both an international dialing prefix and a country code to the phone number when the phone number does not include the international dialing prefix and the default country code.

Another aspect of the present invention concerns synchronizing phone number entries from a phone directory for a voice network with a directory for members of a synthetic communication network. One implementation receives a request to determine if a phone number used for a voice network can also receive communications over a synthetic communication network that transmits messages over a data network. To make the determination, the implementation obtains a normalized version of the phone number from the entry in the phone directory that includes a country code and formatted consistent with phone numbers registered on the synthetic communication network. A comparison then determines if a normalized phone number from an entry in the phone directory matches a normalized phone number registered with the synthetic communication network. When a match is found, aspects of the present invention indicate that the phone number from the entry in the phone directory is registered on the synthetic communication network and can be used to transmit messages over the synthetic communication network.

In various additional embodiments, a method, system, apparatus, and computer program product are provided for exchanging multimedia data between one or more different mobile devices. Many times the multimedia data on one mobile device cannot be processed on another mobile device due to different formatting requirements, codes, decoders, or other drivers between the two or more devices. Accordingly, a transmitting mobile device may identify that certain multimedia data formatted in accordance with a primary format is to be sent to a receiving mobile device even though the receiving mobile device cannot process the multimedia data formatted in the primary format. To accommodate this dilemma, the transmitting mobile device uploads the multimedia data formatted in accordance with the primer format to a multimedia communication server and in return receives a multimedia identifier. The multimedia data is associated with the multimedia data uploaded to the multimedia communication server and can be used to track the location of the multimedia data both on the transmitting mobile device and many other receiving mobile devices. Instead of sending the actual multimedia data, the transmitting mobile device only has to forward the multimedia identifier to any receiving mobile device. Depending on compatibility requirements, the receiving mobile device uses the multimedia identifier to request transcoding the multimedia data in o a secondary format on the multimedia communication server that the receiving mobile device can receive and process.

In further embodiments of the present invention, the multimedia communication server receives a request to upload multimedia data formatted in accordance with a primary format on the multimedia communication server and make available for access by one or more receiving mobile devices. Access is provided to these receiving mobile devices even though it is possible that some, if not all, will be unable to process the multimedia data in the primary format as it is stored and will need to have the multimedia data transcoded, typically on demand, into a secondary format depending on the compatibility requirements of the receiving mobile device. Rather than sending to any receiving mobile devices, the multimedia communication server obtains the multimedia data and stores it ready to be transcoded from the primary format into one or more secondary formats as required by the compatibility requirements of each receiving mobile device. The multimedia communication generates and transmits, usually in return to the transmitting mobile device, a multimedia identifier associated with the multimedia data stored in the primary format and to be used by the receiving mobile devices to reference the location of the multimedia data on the server. When the multimedia communication server later receives the multimedia identifier, the server transcends the multimedia data formatted in the primary format into a secondary format that the receiving mobile device providing the multimedia identifier is capability of receiving and processing.

Embodiments of the present invention also include receiving a multimedia identifier associated with multimedia data stored on a multimedia communication server in a primary format that cannot be processed by the receiving mobile device. Upon receiving the multimedia identifier, the receiving mobile device may respond by transmitting a download confirmation indicating a secondary format for the multimedia data that the receiving mobile device can process. In some cases, the compatible secondary format is specified explicitly in the download confirmation sent back to the server while in other situations, the secondary format for the receiving mobile device is contained in a profile for the receiving mobile device that the server can query and access compatibility information. Once the secondary format of the data is made available on the multimedia communication server, the receiving mobile device receives the multimedia data transcoded from the primary format that the receiving mobile device cannot process into the secondary format that the receiving mobile device can process.

BRIEF DESCRIPTION OF THE DRAWINGS

Like reference numbers and designations in the various drawings indicate like elements.

DETAILED DESCRIPTION

Figure 1:
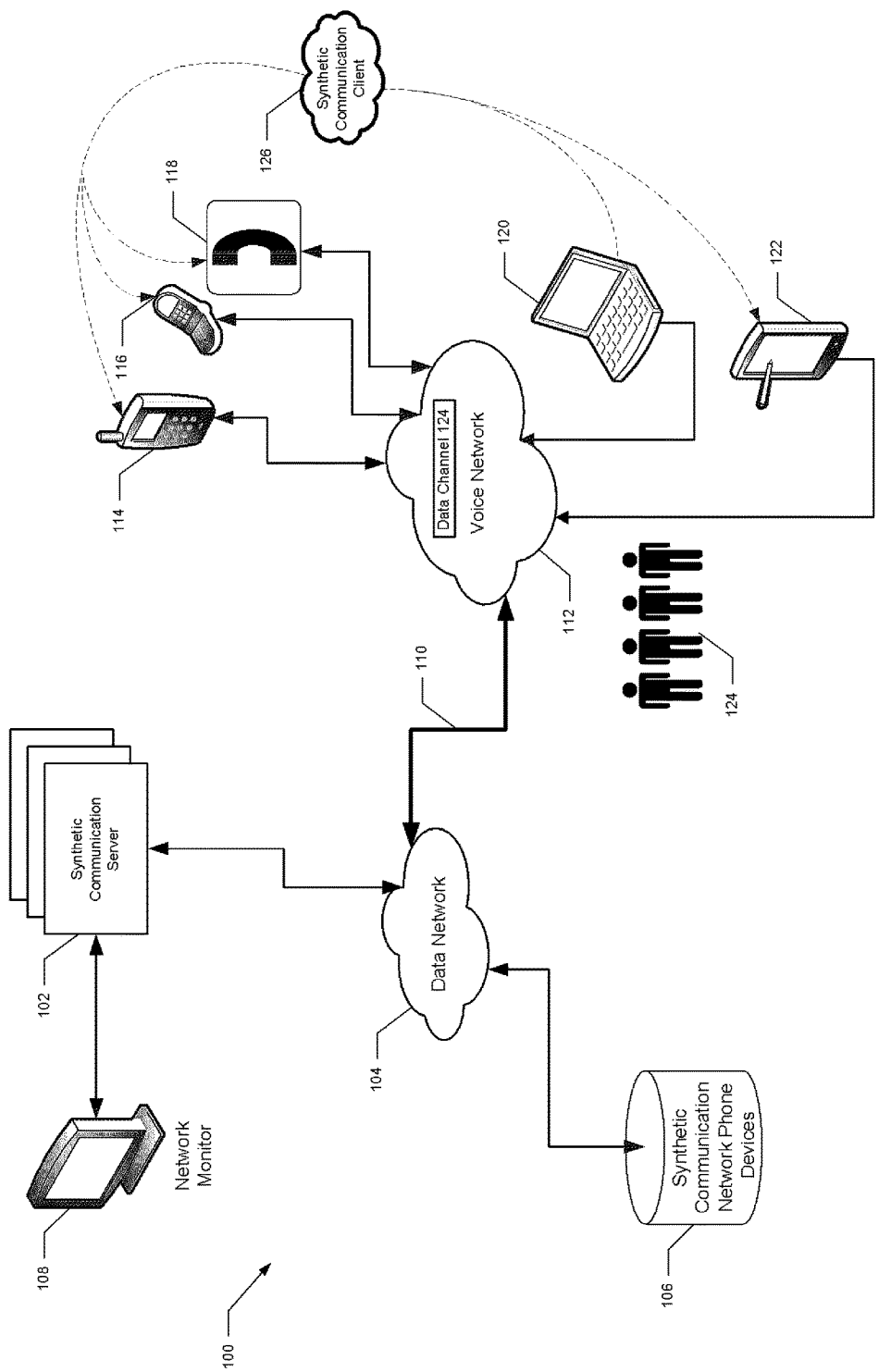
FIG. 1 is a block diagram illustrating a synthetic communication network created using a phone number and data network in accordance with one implementation of the present invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Aspects of the present invention provide one or more of the following advantages. Users can register their phone devices and join a synthetic communication network using a phone number previously only available for use on a voice network. The same phone number provisioned by a phone company or wireless phone provider can be reused on the synthetic communication network and take advantage of new data communication services. Some of the data communication services made available through the synthetic communication network includes features not available on the conventional voice network. For example, users of the synthetic communication network may use their phone number to enjoy a feature-rich form of text messaging on their phone devices not available on the voice network.

The synthetic communication network also offers more competitive pricing on data communication services than a voice network. Aspects of the present invention combine the convenience of using a phone number with a development platform for use with the Internet and other data networks. By opening the development platform to data networks, users are not limited to pricing schemes dictated by a phone company or wireless phone provider managing the voice network. Instead, the users may use their phone number and directly subscribe to new data communication services through the Internet. While the phone company or wireless provider may control the initial provisioning of a phone number, aspects of the present invention allows the phone number to access a wider range of data communication services with competitive pricing and feature richness.

Phone number verification implemented in accordance with aspects of the present invention enables phone numbers provisioned from the voice network to be reused on a data network. The synthetic communication client works with the synthetic communication server to make sure the phone number is associated with the particular phone device. Aspects of the present invention may re-verify the association between the phone number and the phone device just in case the phone number has been abandoned and reassigned by the voice network to a different phone device. Once a phone number is verified, the phone device may register and begin using their phone device on the synthesized communication network without requesting additional services from their wireless phone carrier.

The synthetic communication network of the present invention further allows the use of phone numbers provisioned from voice networks around the world. A normalization process performed on the phone numbers in accordance with the present invention prevents conflicts from occurring between two different phone numbers. Even if phone numbers from two different countries initially appear the same, normalization ensures that phone numbers can be distinguished. Normalization performed in accordance with aspects of the present invention allows phone numbers provisioned from around the world to be used on the synthetic communication network.

Aspects of the present invention can also keep status on phone devices even though they might be members of different voice networks. The normalized phone number for each phone device is used to identify and track the status of each phone device. If a user changes the status on a phone device then all other phone devices on the synthetic communication network may potentially receive the status update.

FIG. 1 is a block diagram illustrating a synthetic communication network 100 in accordance with aspects of the present invention. In one implementation, a synthetic communication server 102 and network monitor 108 are operatively coupled together to a database of synthetic communication network phone devices over a data network 104. For example, the database of synthetic communication network phone devices 106 includes records of the phone devices registered on the synthetic communication network 100. Data network 104 may include one or more data networks having access to the Internet and further access to a voice network 112 over a communication bridge 110.

A wireless phone provider may provide voice network 112 and communication bridge 110 in order to connect phone devices on voice network 112 to data network 104 and the Internet or an Intranet. Alternately, voice network 112 may be provided by a hybrid phone provider offering both wired and wireless devices that also have access to the Internet or an intranet over communication bridge 110 and data network 104. In general, voice network 112 provides voice communication between phone devices registered on the voice network 112 and data services like SMS text messaging through data channel 124. In this example, voice devices on voice network 112 may include wireless smart phones 114, conventional wireless phones 116, wired telephones 118, netbooks 118 and smartbooks 122. Indeed, it is contemplated that the voice network may include a mobile music player device if it has Wi-Fi connectivity. Each phone device is provisioned a phone number and some have the ability to display text and/or images in addition to transmitting voice. These phone devices also have the ability to access a data network using a data protocol such as TCP/IP. Both netbook 118 and smartbook 122 have general purpose computing capabilities but also have been provisioned with phone numbers from the voice network 112 and therefore can also transmit voice in addition to accessing data network 104.

The wireless phone provider of voice network 112 may implement any one or more different wireless protocols. Typically, most wireless providers use Global System for Mobile (GSM), Code Division Multiple Access (CDMA) or some variant compatible with one or more features of these technologies. Each of these and other wireless protocols support a data channel 124 that transmits text and data between phone devices using the SMS protocol. Due to limitations of voice network 112, SMS messages are limited to approximately 128 to 160 characters and managed entirely by the wireless phone provider of the voice network 112.

Little has evolved in the area of SMS messaging as access to these systems are proprietary and controlled by the wireless phone providers. In part, these efforts are an attempt by the wireless phone providers to protect the revenue stream generated by the per message fees and additional charges. Alternate protocols such as Multimedia messaging service (MMS) allows multimedia transmission in addition to text however suffer similar limitations within the voice network 112.

To address these and other limitations, aspects of the present invention allow much more robust communication while reusing the phone numbers provisioned from the voice network. Synthetic communication server 102 creates a connection between phone devices over the Internet and bypasses data channel 124. Phone devices registered on the synthetic communication network 100 may subscribe to improved text messaging and other data services across data network 104 in accordance with aspects of the present invention using their phone number provisioned on the voice network 112. In turn, users 124 of these registered phone devices have improved text messaging and other data services at lower or no per message costs. Instead of per message charges, phone devices would only have to subscribe to Internet access in order to reach data network 104 over bridge 110. The Internet access on these phones devices may use one or more different data plans incorporating technologies such as Enhanced Data Rates from GSM Evolution (EDGE), Universal Mobile Telephone Standard (UMTS), High Speed Downlink Packet Access (HSDPA) and Evolution Data Optimized (EVDO). Phone devices may also access data network 104 and the Internet using other wireless technologies such as WiMAX, Wi-Fi 802.11a/b/c/n/x or other similar protocols.

Figure 2:
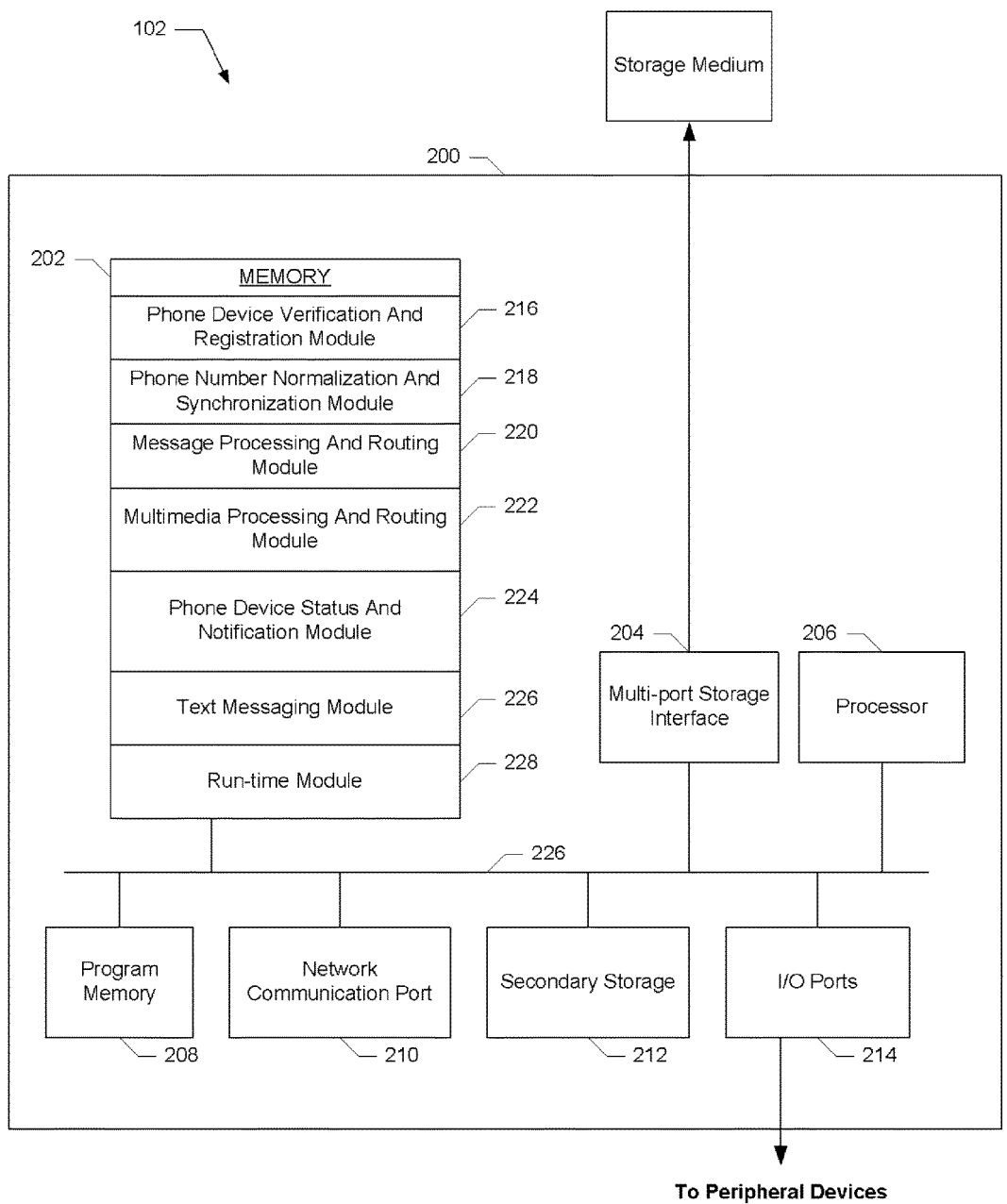
FIG. 2 is a block diagram of a system used in one implementation for performing the apparatus or methods of the present invention in accordance with one implementation of the present invention.

FIG. 2 is a block diagram of a system 200 used in one implementation for performing the apparatus or methods of the present invention. System 200 includes a memory 202 to hold executing programs (typically random access memory (RAM) or writable read-only memory (ROM) such as a flash ROM), a multiport storage interface 204, a processor 206 for executing instructions, a program memory 208 for holding drivers or other frequently used programs, a network communication port 210 for data communication, a secondary storage 212 with secondary storage controller for backup/high-availability, and input/output (I/O) ports 214 with I/O controller operatively coupled together over an interconnect 226. In addition to implementing the present invention using a conventional personal computer or server, system 200 can be preprogrammed, for example, using field-programmable gate array (FPGA) technology, ROM or it can be programmed (and reprogrammed) by loading a program from another source (for example, from a floppy disk, a CD-ROM or other computer-program product with executable instructions or another computer). Also, system 200 can be implemented using customized application specific integrated circuits (ASICs).

In one implementation, processor 206 executes instructions in memory 202 selected from one or more components including phone device verification and registration module 216, phone number normalization and synchronization module 218, message processing and routing module 220, multimedia processing and routing module 222, phone device status and notification module 224, and run-time module 225 that manages system resources used when processing one or more of the above components on system 200.

Phone device verification and registration module 216 verifies that a phone number has been provisioned to a phone device then registers the phone device on the synthetic communication network in accordance with implementations of the present invention. One verification module of the present invention retrieves the phone number directly from firmware on the phone device and performs the verification operations. Alternatively, the user of the phone device may supply the phone number for the phone device through a keyboard or other data entry device associated with the phone device. Aspects of the present invention first verify that the phone number is registered with the particular phone device before it can be registered on the synthetic communication network of the present invention. Over time, it may be necessary to verify a phone number more than once to ensure it is still associated with a particular phone device. In some cases, a phone number initially associated with one phone device may later be associated with a different phone device if the owner of the phone device cancels the voice service or changes providers. The phone number and corresponding phone device can be registered on the synthetic communication network in accordance with aspects of the present invention and begin transmitting data once it has been successfully verified.

Phone number normalization and synchronization module 218 normalizes the format of different phone numbers in a phone directory on the phone device to a predetermined standard. Implementations of the present invention process each phone number and considers how they should be modified and/or formatted. The normalized phone numbers preferably conform to an international telephone number (ITN) standard and incorporate a country code and other information to identify the ITN on a uniform basis.

The normalized phone numbers are used to synchronize the phone directory of phone numbers with registered phone numbers on the synthetic communication network of the present invention. If a phone number in the directory is also registered on the synthetic communication network then it is added or synchronized with entries in the synthetic communication client running on the phone device. This synchronization continues as new phone numbers are added to the phone directory and normalized phone numbers are added to the synthetic communication network.

Message processing and routing module 220 ensures messages from one phone device pass to another phone device in accordance with aspects of the present invention. The messages on the synthetic communication network use the normalized phone numbers to identify phone devices with particularity. Once identified, the routing module creates a network connection between the phone devices using a protocol such as TCP/IP. This message processing and routing module 220 generally passes text messages between phone devices registered on the synthetic communication network according to their previously verified and normalized phone numbers. In some implementations, messages processed by routing module 220 may operate in a compatibility mode and thus transmit one or more groups of 140 text characters. Alternatively, message processing and routing module 220 may indeed transmit a variable length of characters unlimited by the 140 characters of legacy SMS communication but instead dependent upon the length of the message being transmitted and capacities of the phone device sending or receiving the message.

Multimedia processing and routing module 222 operates in similar manner except that it processes a wider range of data types and may send images, video, sound or other data to a normalized phone number. Additional compression and encoding methods may be implemented on the multimedia processing and routing module 222 to effectively increase transmission bandwidth and decrease storage requirements.

Phone device status and notification module 224 enables phone devices to update their current status while tracking the status of other phone devices within the synthetic communication network. The synthetic communication client running on each phone device generally sends status updates to the synthetic communication servers. Likewise, the synthetic communication server sends updated status out to each of the phone devices tracking the status of the other phone devices. Aspects of the present invention also allows the synthetic communication client to determine the status of other members in their phonebook or directory without initiating a phone call, text message or even a separate communication session. For example, phone device status information may be obtained by accessing the synthetic communication servers holding the status in a status area on the servers.

Text messaging module 226 provides conventional text messaging functions used for phone number verification in accordance with aspects of the present invention. Conventional text messaging sends text messages to phone devices over a data channel portion of a voice network. Aspects of the present invention send a verification text message using text messaging module 226 to confirm that a phone number is associated with the particular phone device. In one implementation, text messaging module 226 subscribes to national and international SMS services to verify phone numbers nationally and internationally.

Figure 3:
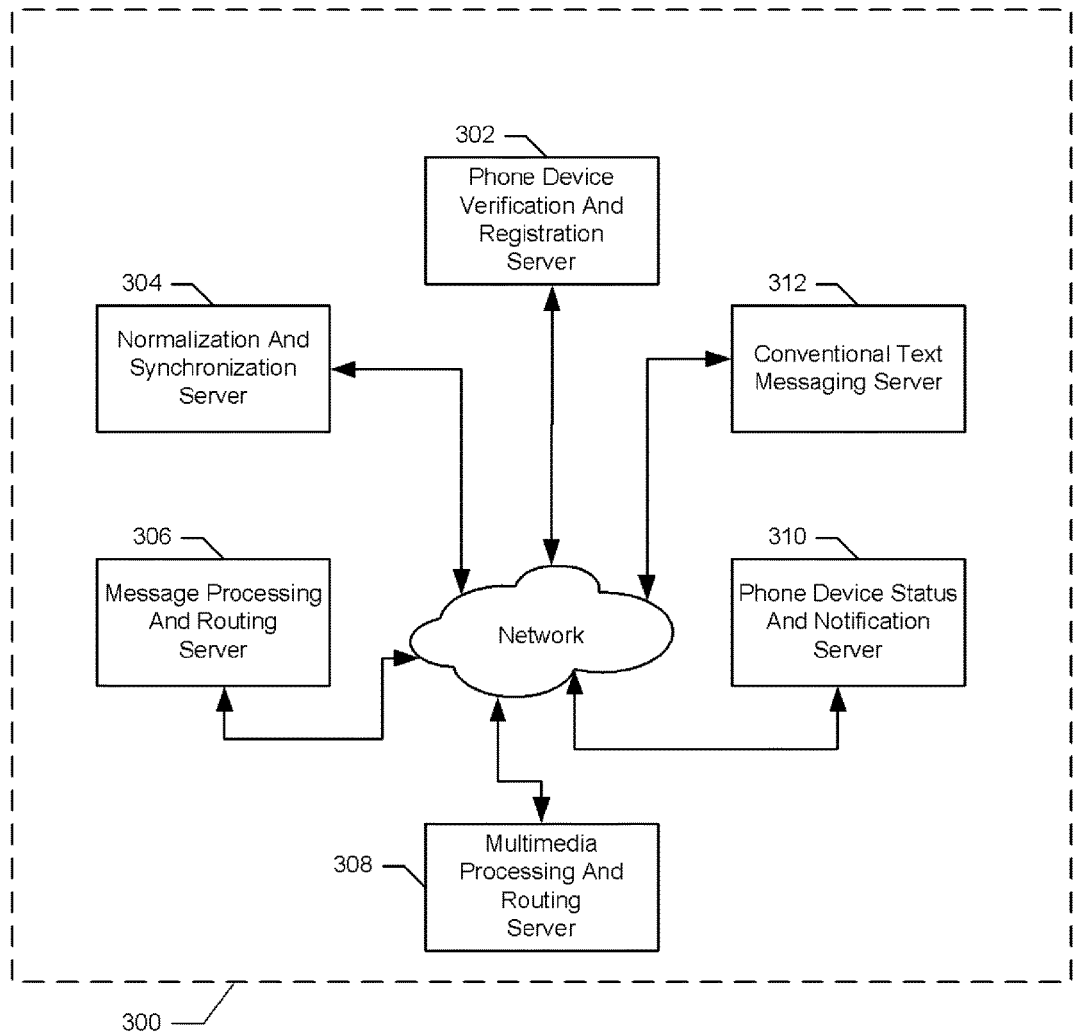
FIG. 3 is a block diagram for an alternate system used in one implementation for synthesizing a communication network in accordance with aspects of the present invention.

FIG. 3 is a block diagram of an alternate system 300 implementing a synthetic communication server 102 in accordance with aspects of the present invention. Instead of single computer system, alternate system 300 uses a cluster of computers to performing different discrete functions of the synthetic communication server 102. It is contemplated that the cluster of computers in alternate system 300 may be separate and distinct physical computers or virtual computers implemented using one or more virtual machines with virtualization technology made available through companies such as VMWARE 10 Palo Alto, Calif.

In general, the cluster of computers advantageously improves scalability through better overall utilization of resources and increases reliability as it is less likely for multiple computers to fail simultaneously. One implementation of this alternate system 300 may separate the different functions used in implementing aspects of the present invention onto different computers within the cluster of computers. For example, it is contemplated that six virtual machines may each be configured to execute phone device verification and registration server 302, normalization and synchronization server 304, message processing and routing server 306, multimedia processing and routing server 308, phone device status and notification server 310 and conventional text messaging server 312 on a cluster of three physical computers with virtualization technology. These different servers in alternate system 300 function in a similar manner as the aforementioned corresponding modules described in conjunction with and illustrated in FIG. 2. Indeed, it is further contemplated that these different servers may include added administrative functions so they can be separately administered and increased interprocess communication so that the individual servers may share information and take advantage of the inherent redundancies and failover possibilities available on the cluster configuration of the present invention.

Figure 4:
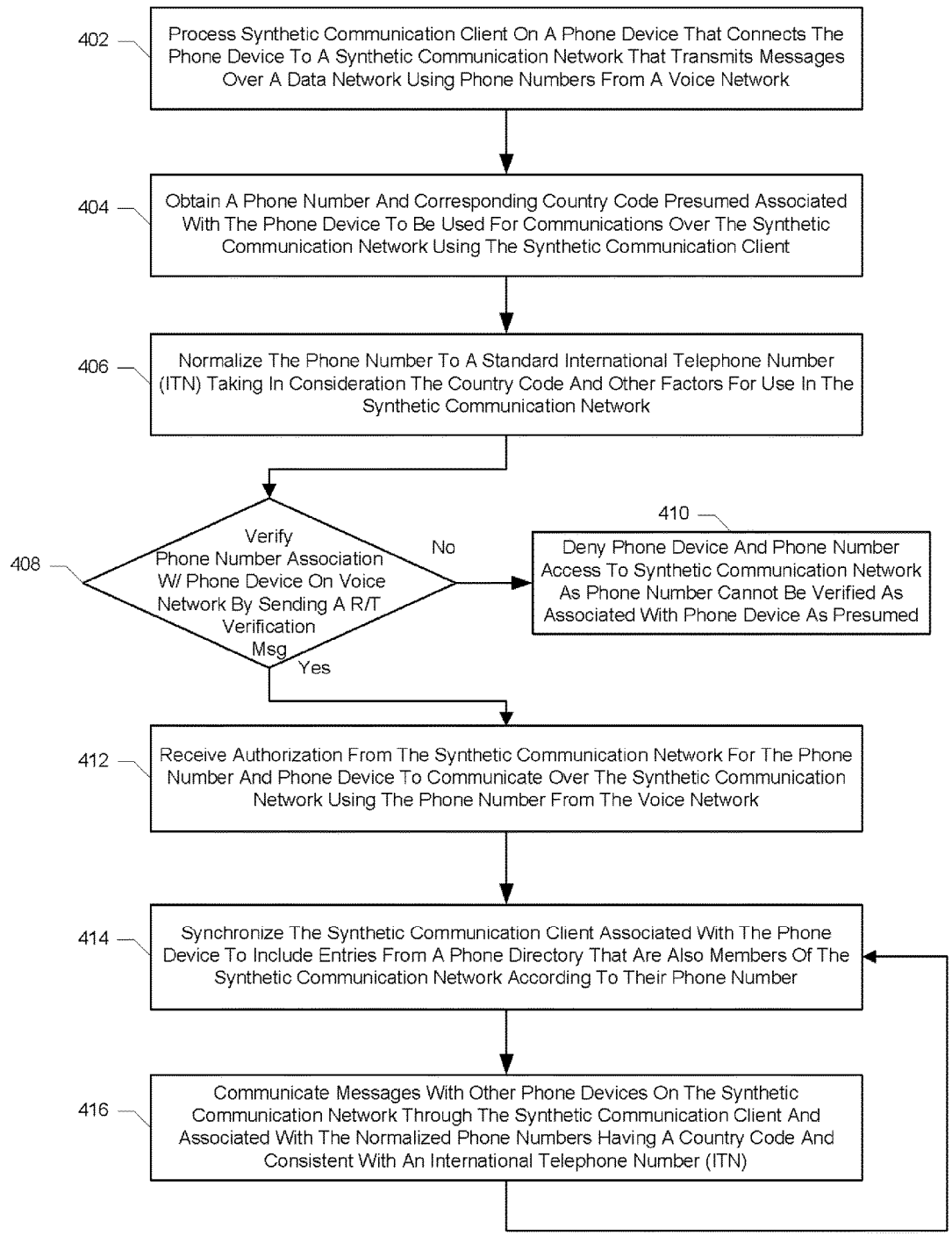
FIG. 4 is a flowchart representation of the operations for registering a phone device on the synthetic communication network in accordance with aspects of the present invention.

FIG. 4 is a flowchart representation of the operations used by a phone device to register on the synthetic communication network using a phone number in accordance with one implementation. The synthetic communication client executes on the phone device in accordance with aspects of the present invention using a phone number from a voice network to connect the phone device to the synthetic communication network (402). Synthetic communication client performs various operations including registering the phone number and eventually facilitating the communication of text, images, video and other media over the synthetic network using the phone number. This synthetic communication client may be downloaded directly over-the-air using wireless communication protocols or through a website accessed by the phone device over the Internet. For example, the synthetic communication client may be downloaded wirelessly through the Apple® Application Store, a website on the Internet or other distribution points and then onto the phone device. Alternatively, a synthetic communication client may also be downloaded and installed directly on the phone device through a memory card, hard drive or other storage device attached to the phone device.

In one implementation, the synthetic communication client obtains the phone number and corresponding country code presumed to be associated with the phone device and used for communications over the synthetic communication network (404). The synthetic communication client running on the phone device may present a series of default options suggesting an international dialing prefix, a country code and a request that the user enter the phone number of the phone device. Typically, these options are suggested by the synthetic communication client based upon the country that the phone device is currently registered in. However, it is also possible that a user can override these suggested settings and enter their own country code, phone number and other information in the default options.

It is also possible for the client obtain the phone number from the phone device programmatically through an application programming interface (API). For example, the synthetic communication client may interface with an API that accesses an area of firmware on the phone device holding the phone number provisioned to the phone device when it was registered on the voice network. In this implementation, the phone number obtained through the API is automatically entered into the "phone number field" section of the synthetic communication client application. The user may decide to accept or modify the phone number in the "phone number field" suggested by the client. As such, it is also possible for the user to erase the suggested phone number entirely and specify a different phone number in the "phone number field" of the client as previously described.

Next, the synthetic communication client normalizes the phone number to a standard international telephone number (ITN) format taking into consideration the country code and other factors for use in the synthetic communication network (406). Normalizing the phone number to the ITN allows the synthetic communication network to uniquely identify the phone number and phone device on an international basis. Without normalization, it might be possible for two phone devices from different countries or areas to have identical phone numbers on the synthetic communication network. The normalized phone number ensures a country code and other fields are in the phone number thus greatly limiting or eliminating the possibility of duplicate phone numbers existing on the synthetic communication network. To avoid the potential conflict, the normalization process performed in accordance with the present invention makes sure each phone number adheres to the following ITN format:

International Telephone Number (ITN) Format:
+<CC><Phone number>
"+": International dialing prefix—This is the standard prefix to indicate that a country code and phone number associated with the country code follows.
"<CC>": Country code—The one, two or three digit country code specifies the country associated with the phone number that follows. For example, United States is country code "1" and United Kingdom is country code "44".
<Phone Number>: Phone number—this is the phone number that the user of the phone device may typically provide as their phone number to others in their own country.

Several operations may be performed in normalizing the phone number associated with the phone device. The synthetic communications client first attempts to incorporate the International dialing prefix "+" and "<CC>" and Country code to the phone number provided. Aspects of the present invention presumes that the phone number provided does not include the International dialing prefix of "+" (or its variants) or the country code and therefore adds them to the phone number. The country code defaults to the country code associated with the country where the phone has been registered or, alternatively, whatever country the user of the phone device specifies is the country of origin. The "+" symbol is added because it indicates that the country code and phone number will subsequently follow in sequence thereafter.

Second, the synthetic communications client may check for a few different conditions of the phone number. A lead-in character or characters may be added or removed from the start of the phone number. Some users may inadvertently add lead-in characters to their phone number out of habit to indicate access to local exchanges or other conditions. However, if a lead-in character is not meant to be part of the ITN then the client proceeds to remove the lead-in character from the phone number. For example, a lead-in character of "0" in a phone number in the United Kingdom indicates a local dialing prefix however it is not used in the ITN representation of a United Kingdom phone number. Accordingly, the synthetic communications client will remove the lead-in character "0" from a phone number when the country code associated with the United Kingdom (i.e., "44") is indicated.

Alternatively, the voice network in certain countries may need to add a lead-in character to the phone number for a valid ITN. For example, in Mexico a leading "1" is generally inserted after the country code for Mexico (i.e., "52") and before the phone number begins. The synthetic communication client of the present invention may therefore consider prepending a lead-in character of "1" to the phone number when the country code is "52" since few users would know to include this value in their phone number.

Third, aspects of the present invention may also check the length of the phone number to make sure it is the appropriate length for the country specified by the country code. If the length of the phone number is improper, the client may reject the phone number provided and indicate that it is either too long or too short in view of known acceptable phone numbers for the particular country. For example, a phone number having 15 digits may be rejected as longer than the accepted 10 digit numbers used in the United States. Once these and other checks are completed, the phone number for the phone device is considered normalized and the ITN representation of the phone number is ready for verification.

The verification operation ensures that the phone number originally provided to the synthetic communication client is indeed associated with the phone device. Conversely, if the phone number was invalid or associated with another phone device then the verification operation will indicate that the phone number (as well as the ITN representation of the normalized phone number) cannot be verified. Verification in one implementation of the present invention confirms the association between the phone number and the phone device by sending a round-trip verification message over a data channel of the voice network (408). In at least one implementation, the synthetic communication client creates a verification message embedded with text that uniquely identifies the verification message. For example, the embedded text may include a 3-digit randomly generated number to identify the message on its return trip back to the synthetic communication client. Both a "From:" or equivalent field and a "To:" or equivalent field in the verification message use the provided phone number presumed to be associated with the phone device.

In one implementation, the verification message may be sent from the synthetic communication client on the phone device using short messaging service (SMS) on the voice network. A successful return trip of the verification message back to the same synthetic communication client verifies the phone number in accordance with the present invention. Further details on the verification operation are described later herein in further detail. If the verification message does not return then there is an unsuccessful verification of the phone number and phone device association. (408—No) Accordingly, the synthetic communication client may deny the phone device and phone number access to synthetic communication network (410).

If the phone number association with the phone device is verified (408—yes) then the synthetic communication client receives authorization for the phone device to communicate over the synthetic communication network using the phone number from the voice network. In one implementation, a user of the newly added phone number and phone device can then communicate with other users who also have phone devices and phone numbers admitted to the synthetic communication network of the present invention. Thereafter, data is transmitted between phone devices on the synthetic communication network using each the respective phone number represented as a unique ITN.

The synthetic communication client offers to check if some or all of the phone numbers in a directory on the phone are also registered on the synthetic communication network. Users typically allow the synthetic communication client to check their phone directory as they want to communicate over the synthetic communication network with their current friends and associates. Accordingly, the synthetic communication client associated with the phone device is synchronized with entries in the phone directory from the phone device that are also members of the synthetic communication network (414). Each entry in the phone directory of the phone device is also checked for membership in the synthetic communication network. Aspects of the present invention also continue to update the synthetic communication client to include additional members of the synthetic communication network as new members join and as new phone numbers are added to the phone directory of the phone device.

Once synchronization is complete, aspects of the present invention can communicate messages with other members of the synthetic communication network through the synthetic communication client (416). Typical communication between members of the synthetic communication network is done over a data network such as the Internet using their respective normalized phone numbers having a country code and consistent with an international telephone number (ITN). The simplicity of reusing the phone numbers in their phone directory to communicate with other phone devices makes the synthetic communication network of the present invention compelling. Moreover, users of the synthetic communication network may use the phone number to send text messages over the Internet and not pay expensive per message charges for local and international text messaging over the data channel of their voice network.

Figure 5:
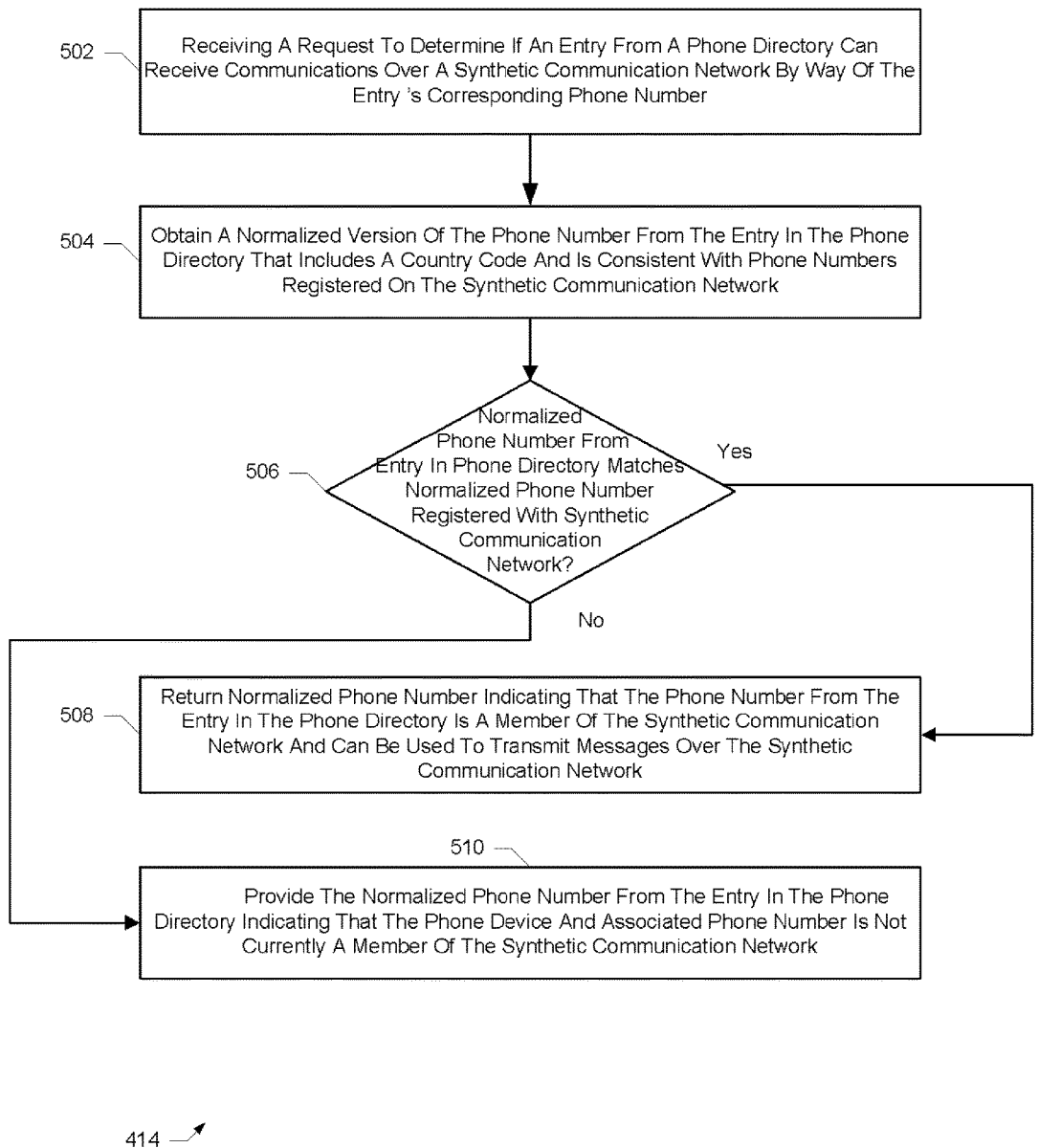
FIG. 5 is a flowchart representation of the operations for independently confirming the association of a phone number and a phone device on the synthetic communication network in accordance with aspects of the present invention.

FIG. 5 is a flowchart diagram of the operations used to determine whether a directory entry from a phone device may participate in communications over the synthetic communication network in accordance with aspects of the present invention. Essentially, these operations determine whether an entry or entries in the phonebook of a phone device are also registered members of the synthetic communication network.

Aspects of the present invention determine if one or more directory entries from a phone device can receive communications over the synthetic communication network using the directory entry's phone number (502). To make such a determination, each phone number in the phone directory of the phone device is compared with registered phone numbers on the synthetic communication network. Making the comparison further involves normalizing phone numbers from the directory in the same manner as registered phone numbers on the synthetic communication network. (504) For example, the normalized version of a phone number from the directory should include a country code and be formatted consistent with an international telephone number (ITN) format. Details on normalizing one or more phone numbers in accordance with aspects of the present invention are described in further detail later herein.

Next, a comparison determines whether the normalized phone number from a directory entry match a normalized phone number registered with the synthetic communication network (506). A match between a normalized phone number from the directory and a normalized phone number registered on the synthetic communication network indicates that the phone number from the directory is also a member of the synthetic communication network. The match does not consider details such as a person's name, address, company or other personal information. Since these details are not part of the comparison and determination, they need not be stored on or sent to the synthetic communication server. Thus, if there is a match between the two normalized phone numbers (506—Yes) then aspects of the present invention return the normalized phone number and indicates that the phone number from the directory is a member of the synthetic communication network. The phone device corresponding to the phone number can be used to exchange messages over the synthetic communication network using the normalized phone number (508). Storing the normalized phone number synchronizes the synthetic communication client with the phone number entries in the directory on the phone device. This synchronized list of normalized phone numbers is used by the synthetic communication client to communicate with other phone devices over the new synthetic communication network.

When the normalized phone number from the directory does not match (506—No), aspects of the present invention may still provide the normalized phone number to the synthetic communication client but indicate that the normalized phone number is not yet registered on the synthetic communication network (510). Likewise, the client may synchronize the normalized phone numbers but will indicate on the graphical user interface (GUI) that the phone number cannot be used to send messages over the synthetic communication network. For example, the GUI of the synthetic communication client may display the name of the person, the corresponding normalized phone number and an icon that the particular number is not yet registered on the synthetic communication network of the present invention. If the normalized phone number subsequently does register, then a different icon on the GUI of the synthetic communication client will indicate that the number is registered and can communicate on the synthetic communication network. Information on the person's name, address, company or other details is generally obtained by cross referencing a normalized phone number with phone numbers from the directory on the phone device. For privacy reasons, the synthetic communication server may leave all personal information within the directory of the phone device and only store normalized phone numbers registered on the synthetic communication network.

Figure 6:
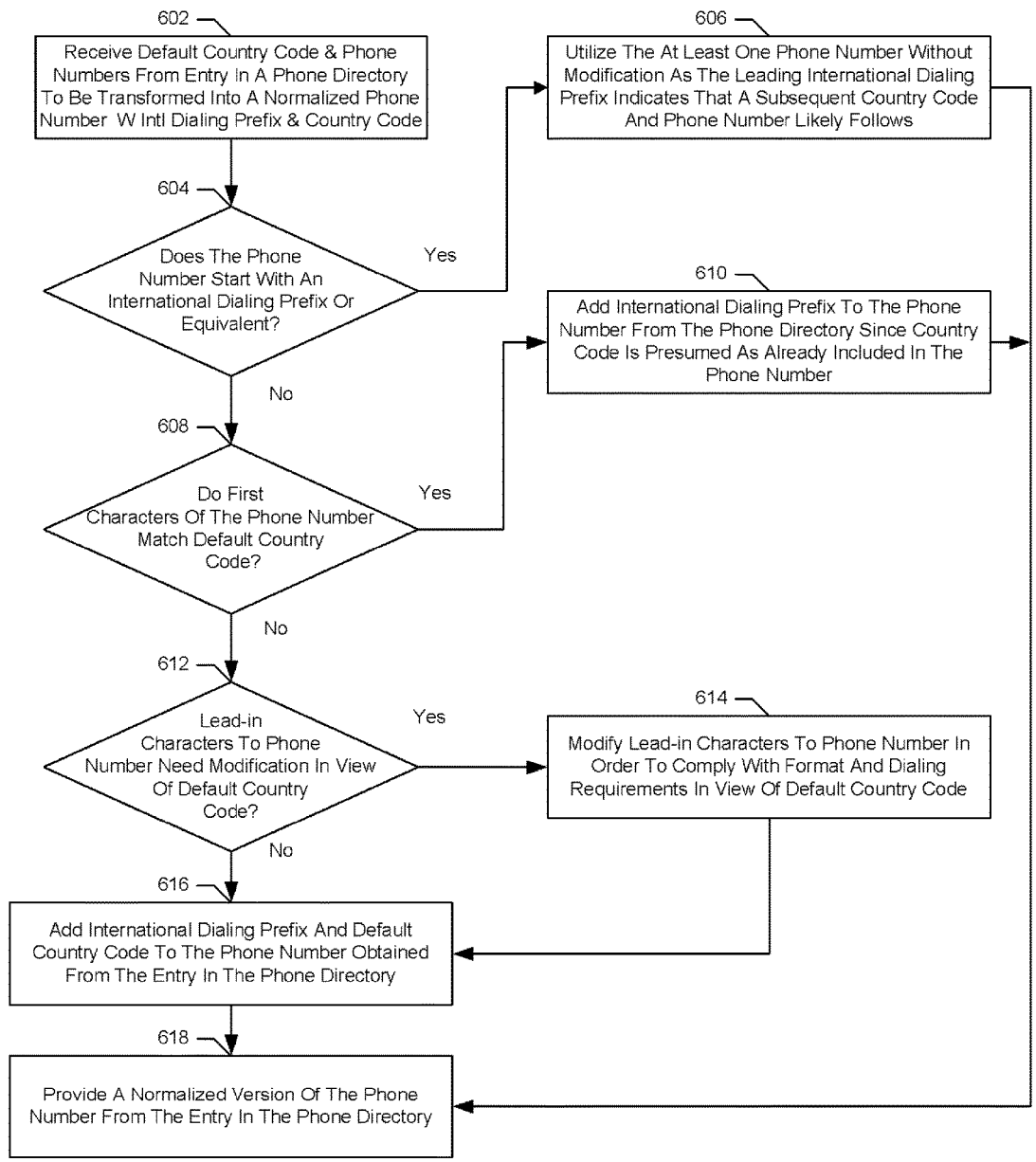
FIG. 6 is a flowchart detailing the operations associated with normalizing at least one phone number from a phone directory on a phone device in accordance with aspects of the present invention.

FIG. 6 is a flowchart detailing the operations associated with normalizing a phone number from a phone directory on a phone device in accordance with aspects of the present invention. Phone numbers normalized in accordance with the present invention can be used to identify and communicate with specific phone devices over a synthetic communication network of the present invention. The synthetic communication network carries messages to phone devices throughout the world even though the underlying phone numbers may have been provisioned from disparate voice networks and different phone carriers located in different countries.

In one implementation, a synthetic communication server receives one or more phone numbers from the phone directory on the phone device and performs the normalization on behalf of the synthetic communication client. Initially, the synthetic communication server receives a default country code and at least one phone number from the phone directory to be transformed into a normalized phone number with international dialing prefix and country code (602). A suggested default country code generally corresponds to the country associated with the voice network where the phone number and phone device were provisioned. In some cases, the default country code of the phone device may be modified by the user of the synthetic communication client to accommodate a different country and country code.

Implementations of the present invention first check whether the phone number starts with an international dialing prefix or equivalent (604). For example, a phone number from the phone directory of a phone device registered in the United Kingdom may be entered as +44 2710 5566. If the "+" symbol is included in a phone number (604—Yes) then aspects of the present invention presumes that the international dialing prefix is followed by a subsequent country code and phone number and in a proper international telephone number (ITN) format as previously described.

Depending on the country code, aspects of the present invention may also replace an alternate international dialing prefix such as a "011" in the United States with the universal international dialing prefix "+". Accordingly, the synthetic communication server may use the phone number without modification if the international dialing prefix is the leading character to the phone number as provided (606).

Next, aspects of the present invention determine if the first few characters of the provided phone number also happen to match the default country code provided (608). If the default country code appears in the first characters (608—Yes) then it is presumed that the phone number includes a country code but is missing an international dialing prefix. Consistent with aspects of the present invention, the synthetic communication server adds an international dialing prefix to the phone number from the phone directory (610).

Alternatively, if the first characters do not match the default country code then aspects of the present invention may determine whether lead-in characters to the phone number need to be added, removed or modified in view of the default country code (612). When the lead-in characters of the phone number need modification (612—Yes) then the synthetic communication server modifies lead-in characters to phone number in order to comply with format and dialing requirements of ITN in view of default country code (614). As previously described, some users may add lead-in characters to phone numbers in their phone directory out of habit or to indicate access to local exchanges or other conditions. If the lead-in character is not meant to be part of the ITN then the normalization process on the server proceeds to remove the lead-in character from the phone number. For example, a lead-in character "0" on the phone number in the United Kingdom may indicate a local dialing prefix however it is not used in the ITN representation of a United Kingdom phone number. Accordingly, the server will remove the lead-in character "0" from a phone number when the default country code provided is the United Kingdom (i.e., "44").

Conversely, voice network in other countries may need a lead-in character added to a phone number to create a valid ITN. For example, in Mexico a lead-in character "1" may be inserted after the country code for Mexico (i.e., "52") and before the start of the phone number. The synthetic communication client of the present invention therefore may prepend a lead-in character of "1" to the phone number when the default country code is 52 as few users might know to include this value in their phones number when dialing internationally.

Additionally, aspects of the present invention may then add both the international dialing prefix and default country code to the phone number obtained from the phone directory. For example, the synthetic communication server of the present invention prepends a phone number with a "+44" when the default country is United Kingdom and no international dialing prefix or country codes are detected in the first portion of characters from the phone number (616).

Once normalized, aspects of the present invention provide a normalized version of the at least one phone number from the phone directory and indicates if a phone number is also a member of the synthetic communication network (618). For efficiency, one implementation of the synthetic communication server may receive and process a group of the phone numbers in a single request. Similarly, the resulting set of one or more normalized phone numbers may be sent back to the synthetic communication client in one transmission. It is advantageous for the synthetic communications server to keep copies of all the normalized phone numbers from each phone device and phone directory. For example, the synthetic communications server may be able to determine if a phone device and phone number are already members of the synthetic communication network by simply comparing the normalized phone number with other previously registered phone numbers and ITN values.

It should be appreciated that membership in the synthetic communication network may be determined using only the phone numbers normalized in accordance with implementations of the invention. Normalized phone numbers stored by the synthetic communication server include country code information and identify the corresponding phone device on an international basis. Registering as a member of the synthetic communication network therefore only requires providing an ITN and not providing any personal information that other communication networks might require, such as a login or username.

Figure 7:
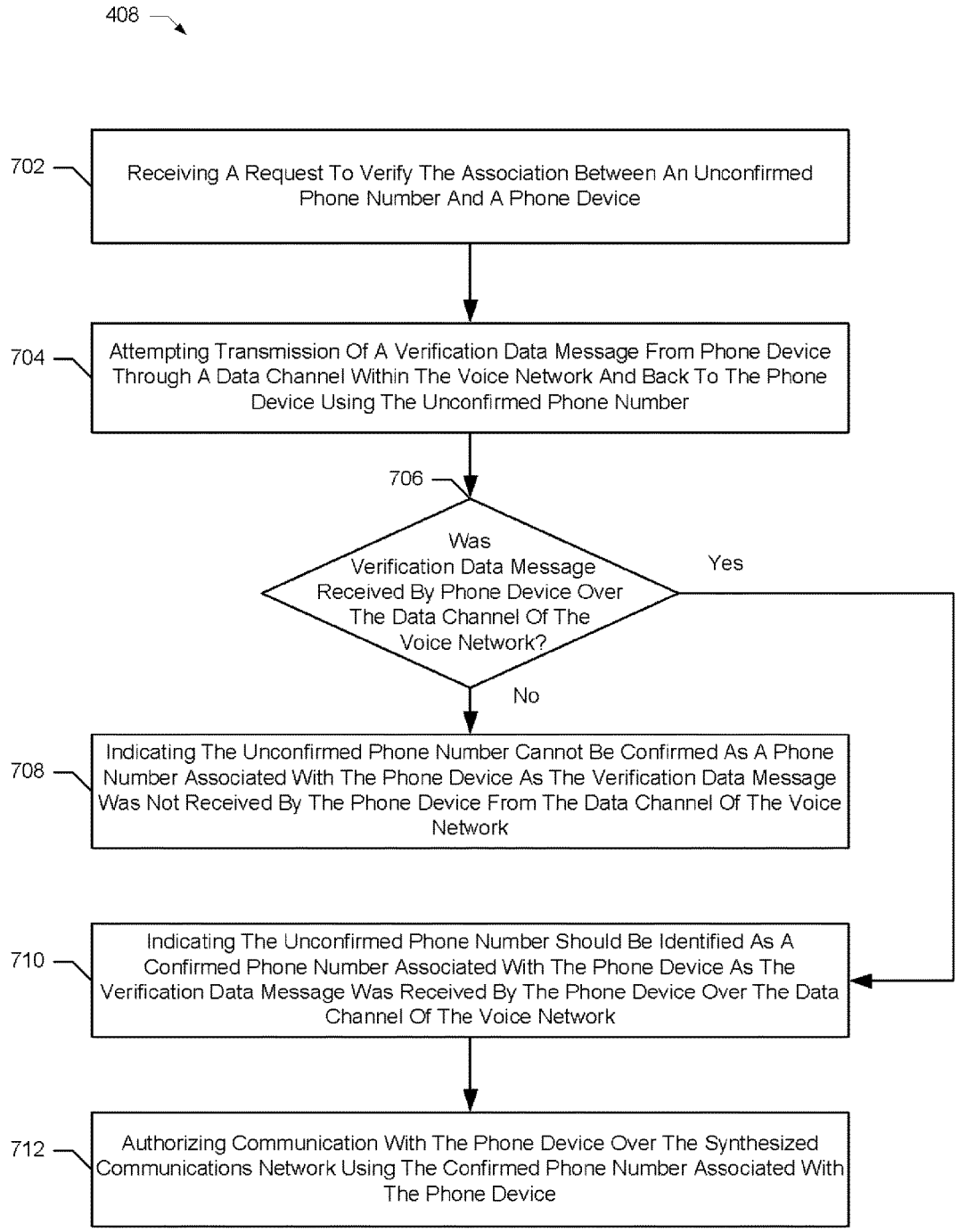
FIG. 7 is a flowchart representation of the operations for registering a phone device on the synthetic communication network in accordance with aspects of the present invention.

FIG. 7 is a flowchart representation of the operations for verifying a phone number is associated with a phone device on the synthetic communication network in accordance with aspects of the present invention. One implementation of the method receives a request to verify that a phone number is associated with a phone device registered on a voice network. As previously described, the phone device may be a wireless phone as well as any other device that is assigned a phone number on the voice network. To begin, the phone number associated with the phone device on the preexisting voice network is presumed to be an unconfirmed phone number (702)a Phone numbers on the voice network are provisioned and managed on the voice network by wireless phone providers and other phone companies but reused on the synthetic communication network of the present invention. It is therefore necessary for the synthesized communication network to independently verify the association of a phone number with a phone device before it can be reliably reused on the synthetic communication network.

Accordingly, one implementation of the present invention attempts transmission of a verification data message from the phone device through a data channel within the voice network and back to the phone device using the unconfirmed phone number (704). In one implementation, the data channel of the voice network allows the verification data message to be up to 140 characters using a short messaging service (SMS). A synthetic communication client executing on the phone device may randomly generate the verification data message up to this character limit and prepare to send it over the data channel using the phone number presumed associated with the phone device. For example, the SMS message may address the phone device using the presumed phone number and include the randomly generated message for verification purposes.

Next, aspects of the present invention determine if the verification message was subsequently received by the phone device over the voice network (706). One embodiment of the present invention uses the synthetic communication client executing on the phone device to compare the original outbound verification data message with the returning verification data message. If the verification data message returned to the synthetic communication client matches then aspects of the present invention have independently verified and confirmed that the phone number is associated with the phone device as presumed (706—Yes). For example, the verification data message may be include randomly generated 3-digit value sent out as an SKIS message that loops back and returns to the synthetic communication client executing on the phone device. The synthetic communication client verifies the phone number of the phone device when the 3-digit value received by the synthetic communication client of the present invention matches the 3-digit value sent out.

Once confirmed, aspects of the present invention indicate the unconfirmed phone number should be identified as a confirmed phone number associated with the phone device (710). The confirmed phone number can be used reliably on the synthetic communication network as the phone number has been successfully and independently verified. Repeated verification may be performed at regular intervals to make sure the phone number has not been disconnected, abandoned or reassigned to a different phone device over time. In general, verification ensures that the phone devices will be able to communicate with each other on the synthetic communication network as expected.

If the phone number can be confirmed then aspects of the present invention authorizes communication with the phone device over the synthesized communications network using the confirmed phone number (712). Alternatively, if the predetermined data message returned to the synthetic communication client does not match (706—No) then aspects of the present invention indicate that the unconfirmed phone number cannot be confirmed and used as a phone number associated with the phone device and the phone number are not registered (708).

Figure 8:
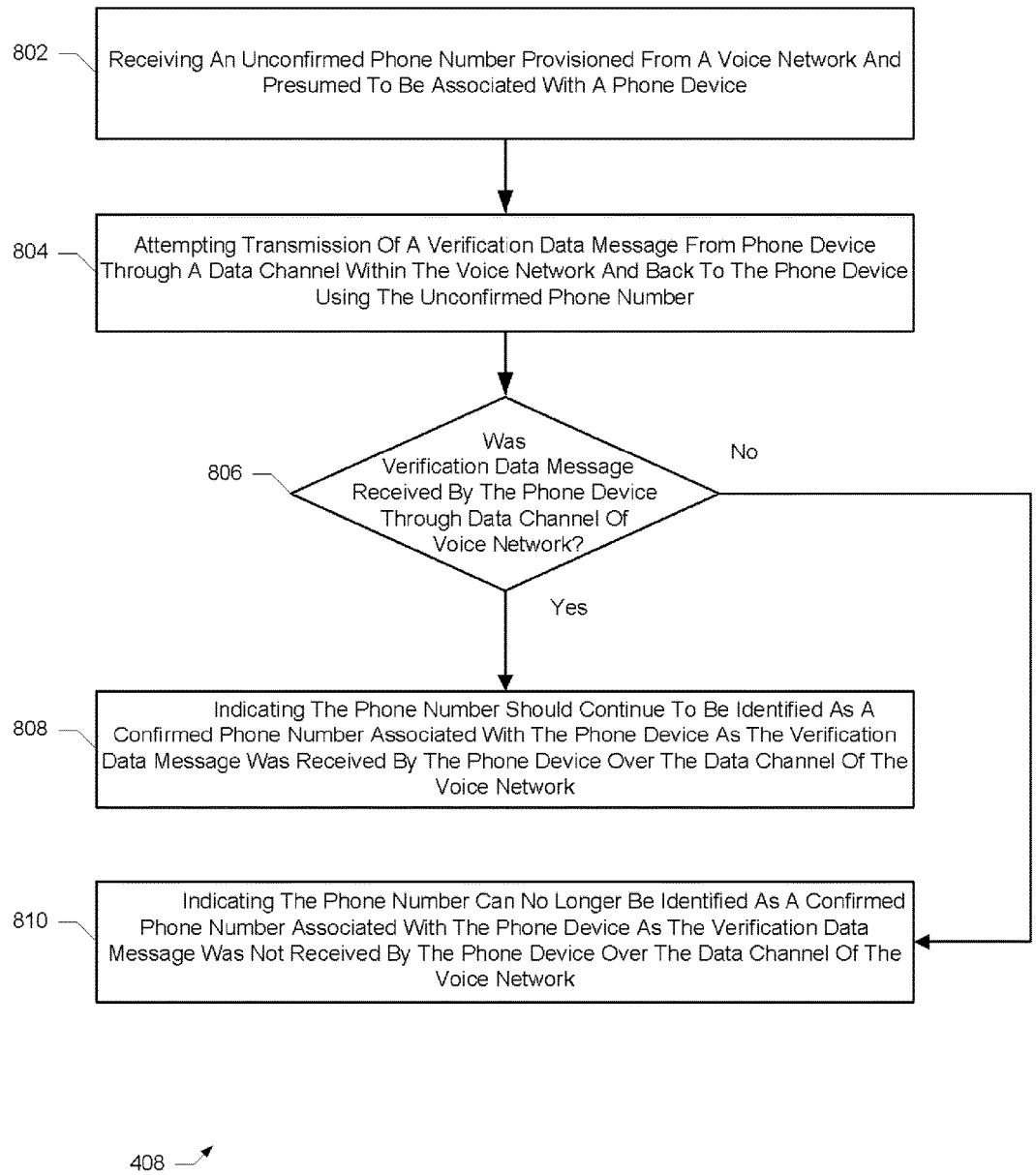
FIG. 8 is a flowchart representation of the operations for independently confirming the association of a phone number and a phone device on the synthetic communication network in accordance with aspects of the present invention.

FIG. 8 is a flowchart representation of the operations for independently confirming the association of a phone number and a phone device on the synthetic communication network in accordance with aspects of the present invention. This aspect of the invention may be used to check whether the phone number of a phone device has changed over a period of time. For example, it may be necessary to reconfirm whether a phone number previously added to the synthetic communication network is still associated with a particular phone device or has been cancelled and transferred elsewhere. Indeed, it is possible that a phone number may be reassigned to another phone device without notice as the phone numbers are provisioned from the voice network and not the synthetic communication network of the present invention.

Aspects of the present invention receive an unconfirmed phone number provisioned from a voice network and presumed to be associated with a phone device (802). The phone device may be a wireless phone as well as any other device that is assigned a phone number on the voice network. It is necessary for the synthesized communication network to independently verify the association of the phone number on the phone device before it can be reliably reused for the synthetic communication network. This is at least because phone numbers are provisioned and managed on the voice network but reused on the synthetic communication network of the present invention.

Accordingly, one implementation of the present invention attempts transmission of a verification message from the phone device through a data channel within the voice network and back to the phone device using the unconfirmed phone number (804). In one implementation, the data channel of the voice network allows the verification message to be up to 140 characters using a short messaging service (SMS). A synthetic communication client executing on the phone device randomly generates the verification message up to this character limit and prepares to send over the data channel using the phone number presumed associated with the phone device. For example, the SMS message may address the phone device using the phone number presumed to be associated with the phone device and include the randomly generated verification message for subsequent comparison.

Next, aspects of the present invention determine if the predetermined message was subsequently received by the phone device over the voice network (806). One embodiment of the present invention uses the synthetic communication client executing on the phone device to compare the original outbound verification message with the returning message. If the message returned to the synthetic communication client matches the verification message then aspects of the present invention have independently verified and confirmed that the phone number is associated with the phone device as alleged (806—Yes). For example, the verification message may be a randomly generated 3-digit value sent in an SMS message that loops back and returns to the synthetic communication client executing on the phone device. Essentially, the confirmed phone number can continue to be used reliably on the new synthetic communication network as the phone number has been successfully and independently re-verified. This ensures that the phone devices are able to communicate with each other over the synthetic communication network as expected.

Once confirmed, aspects of the present invention indicate that the phone number should continue to be identified as a confirmed phone number associated with the phone device (808). Repeated verification may be performed at regular intervals to make sure the phone number has not been disconnected, abandoned or reassigned to a different phone device over time.

Alternatively, if the verification message returned to the synthetic communication client does not match (806—No) then aspects of the present invention indicates that the unconfirmed phone number should no longer be used as a phone number associated with the phone device on the synthetic network in accordance with the present invention (810).

Figure 9:
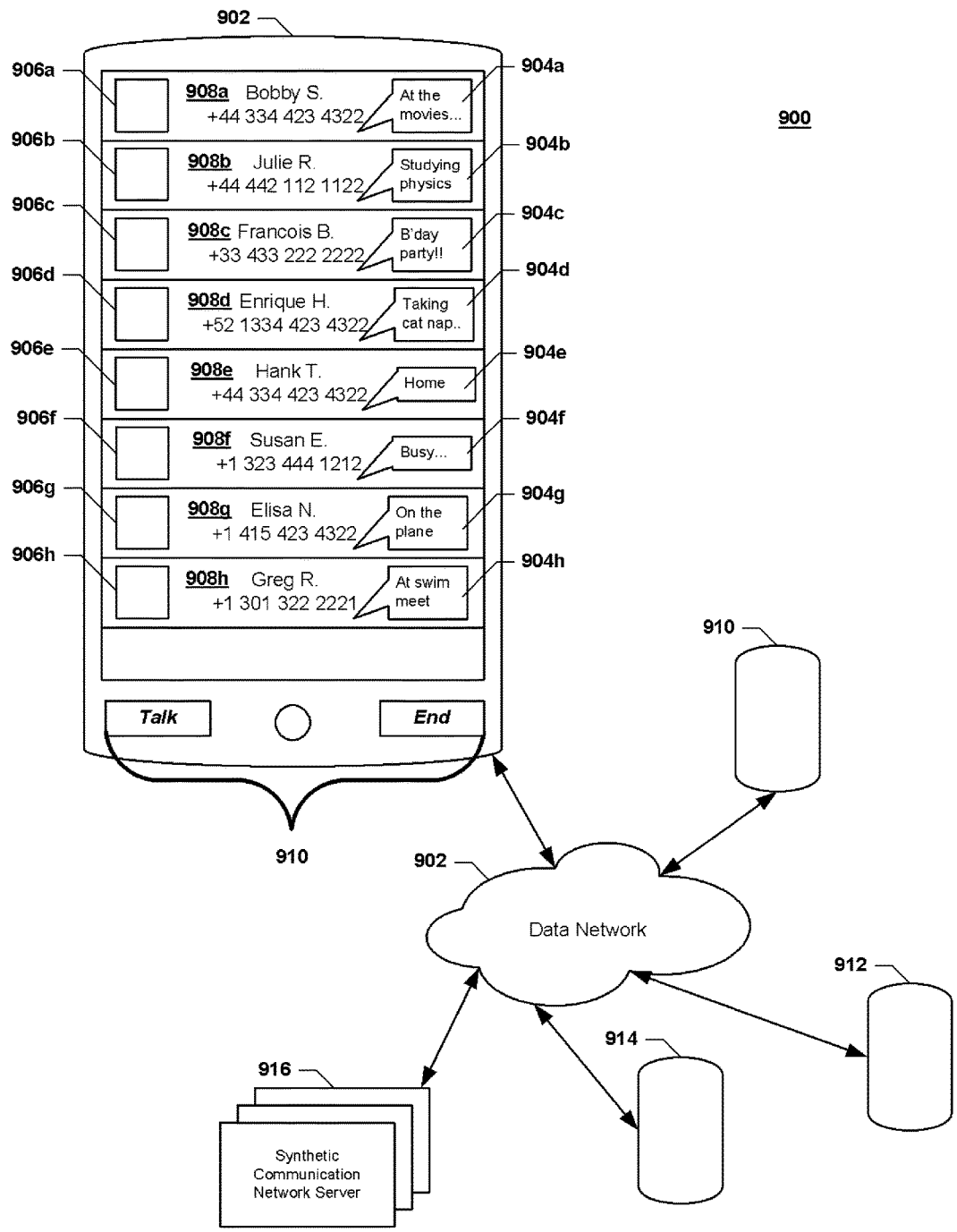
FIG. 9 illustrates a phone device communicating over a synthetic communication network in accordance with aspects of the present invention.

FIG. 9 illustrates a phone device displaying a graphical user interface (GUI) communicating over a synthetic communication network in accordance with aspects of the present invention. In this example, the synthetic communication network 900 includes a detailed view of phone device 902 displaying status of various phone devices and connectivity to some of the other phone devices 910, 912, 914 over a data network 902. Synthetic communication server 916 facilitates communication between phone devices 902, 910, 912 and 914 on the synthetic communication network 900 as well as ensuring status on the phone devices illustrated on phone device 902 is kept updated.

One implementation of the present invention consistent with the GUI of phone device 902 depicts a set of normalized phone numbers being monitored. A status list on the synthetic communication client tracks the status of phone devices and displays the status as indicated by status 904*a-h*. For example, a user may set the status to indicate a specific activity illustrated in status 904*b* such as "Studying physics" or may indicate a general status such as status 904*f* indicating "Busy . . . ". Status on the synthetic communication is flexible and can be set to anything the user wants to indicate.

These normalized phone numbers 908*a-h* also show a user name (First Name Last Initial) and the normalized phone number formatted with both an international dialing prefix and country code. The synthetic communication client of the present invention may be used to manage and display these users and their normalized phone numbers once they are synchronized in accordance with aspects of the present invention as previously described. Additional information may include a corresponding icon or photo 906*a*-906*h* chosen by the phone device being monitored.

Figure 10:
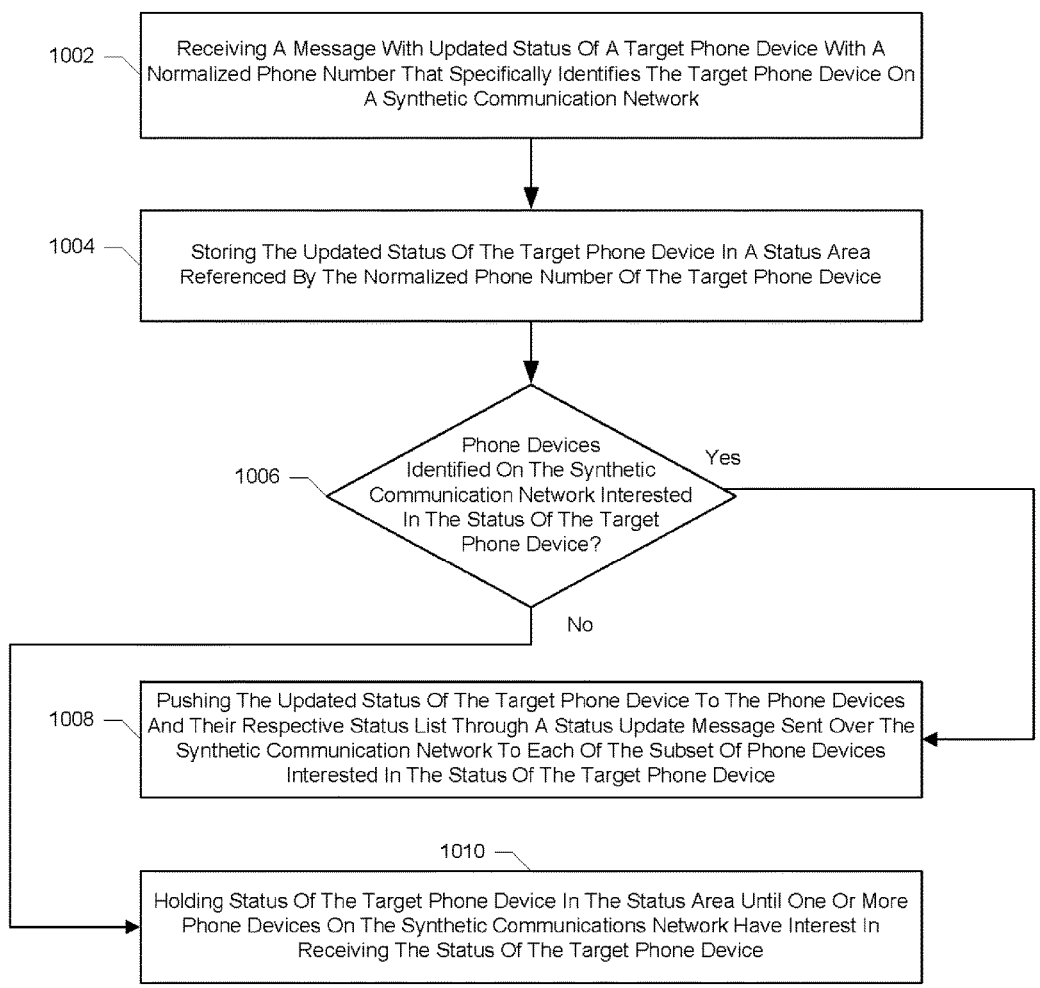
FIG. 10 is a flowchart diagram of the operations associated with processing the status of one or more phone devices in accordance with aspects of the present invention.

FIG. 10 is a flowchart diagram of the operations associated with processing the status of one or more phone devices in accordance with aspects of the present invention. Status associated with the one or more phone devices may be centrally processed on a synthetic communication server operatively connected to the one or more phone devices over a synthetic communication network of the present invention.

In one implementation, a synthetic communication server receives a message with a normalized phone number identifying a target phone device and updated status of the target phone device on a synthetic communication network (1002). Status may indicate that the user of the phone device is currently busy, on a plane, that the phone has actually been turned off or any status message the user of the phone device wishes to provide. Generally, the user enters status information on a synthetic communication client executing on the target phone device. The synthetic communication client transmits the updated status of the phone device by sending a status message over the synthetic communication network to the synthetic communication server.

Aspects of the present invention store the updated status of the target phone device in a status area referenced by the normalized phone number of the target phone device (1004). Entries in the status area also hold the current status of each phone device on the synthetic communication network along with their corresponding normalized phone numbers. Next, the synthetic communication server of the present invention determines if a subset of phone devices from a set of one or more other phone devices on the synthetic communication network is interested in the status of the target phone device (1006). To make this determination, the synthetic communication server downloads a status list from each phone device listing the phone devices to be monitored. The server compares the normalized phone number of the target phone device against normalized phone numbers in the status list from each of the phone devices. Matches from these comparisons determine the subset of phone devices interested in the status of the target phone device.

If the target phone device is being monitored then aspects of the present invention push the updated status of the target phone device to the subset of phone devices and the status list on each phone device (1008). For example, the updated status may be sent to each phone device in the subset through a status update message sent over the synthetic communication network. Individual phone devices process the status updates for target phone device and other phone devices then display the results in a GUI such as the one depicted in FIG. 9 on phone device 902. Alternatively, it is possible that the target phone device is not currently being monitored by other phone devices. If the target phone device is not monitored then the server may hold status of the target phone device in the status area until one or more phone devices on the synthetic communications network have interest in receiving such status (1010). Keeping status on a central server allows the status for the target phone device to be made available even when the target phone device has no connection through a voice network or has been turned off entirely. It also is advantageous as the status or state of the target phone device is preserved and not lost even when no phone device is immediately interested in monitoring the status of the target phone device.

Figure 11:
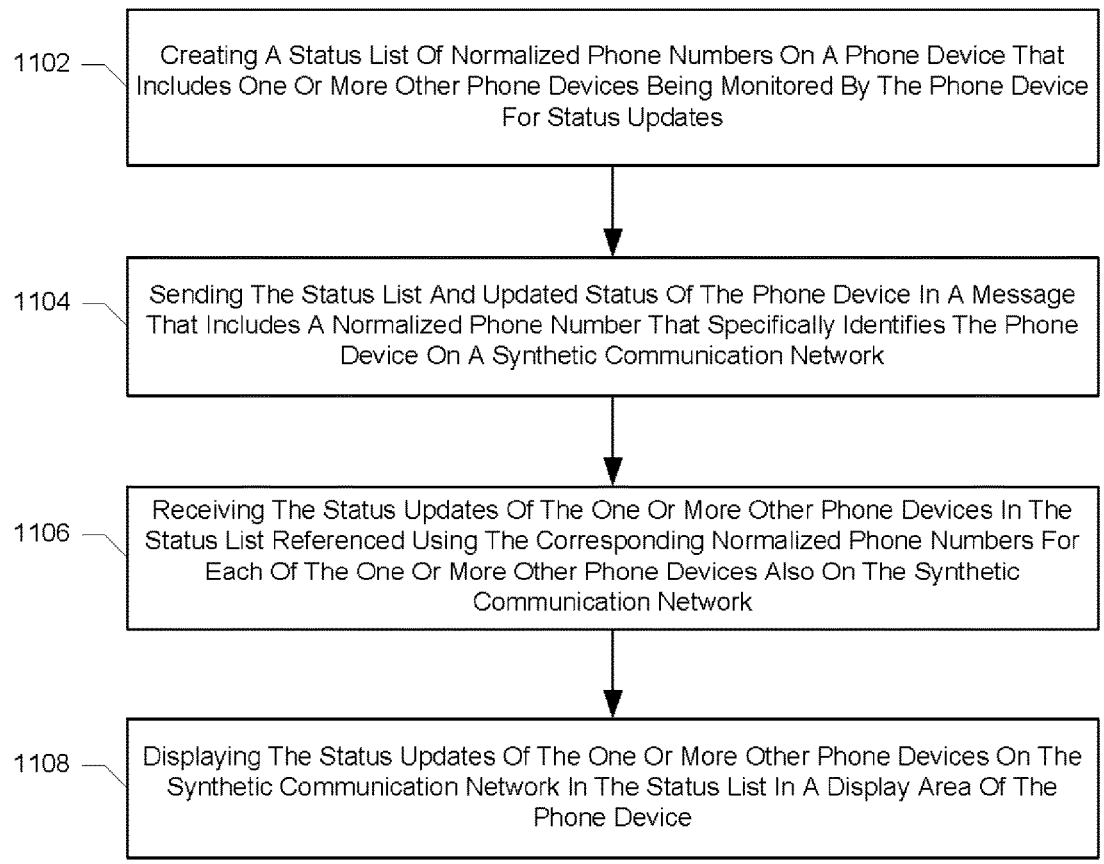
FIG. 11 is another flowchart diagram of the operations for updating status of a phone device and receiving status on other phone devices in accordance with aspects of the present invention.

FIG. 11 is another flowchart diagram of the operations for updating status of a phone device and receiving status on other phone devices in accordance with aspects of the present invention. One aspect of the invention may be processed on a synthetic communication client running on the phone device as illustrated in FIG. 9 as phone device 902. Generally, each phone device creates a status list of normalized phone numbers listing other phone devices being monitored for status updates (1102). In one implementation, the status list of normalized phone numbers is managed through the synthetic communication client executing on the phone device. Users may enter phone devices on the status lists manually or may update the status list by synchronizing with the phone numbers in their phone directory. On the phone device, the status list may hold the most recent status of the other phone devices on the synthetic communication network in addition to corresponding normalized phone numbers and other related information.

The phone device generally sends the status list and an updated status of the individual phone device in a message that includes a normalized phone number that specifically identifies the phone device on the synthetic communication network (1104). For example, a phone device may send the status list of normalized phone numbers in response to a request for the status list from a synthetic communication server. The synthetic communication server receives the updated status of the phone device and updates the appropriate entry in the status area of the synthetic communication server. In addition, the synthetic communication server may also receive the status list of other phone devices being monitored by the phone device.

Next, aspects of the present invention receive the status updates of the other phone devices in the status list referenced using the corresponding normalized phone numbers for each of the other phone devices (1108). In one implementation, the synthetic communication client running on the phone device updates the status list with the status updates of the other phone devices. The phone device may then display the status updates of the one or more other phone devices on the synthetic communication network in a display area of the phone device (1108). One implementation of the present invention may display the status of other phone devices as illustrated in accordance with FIG. 9 and phone device 902. However, it is contemplated that many other interfaces could be developed to provide status of the other phone devices on the synthetic communication network of the present invention using graphical elements on a GUI, text elements, sound or voice.

In implementing one or more embodiments of the present invention, at least one or more of the following advantages may be obtained. Multimedia data can be transmitted between devices despite each device having potentially different multimedia formatting requirements. To send a video or other multimedia data, a transmitting mobile device sends the multimedia data in a format convenient to the transmitting mobile device. The format of the multimedia data transmitted may or may not be compatible with the receiving mobile device. In the event the multimedia is not compatible with the receiving mobile device, implementations of the present invention transcode the multimedia data into a suitable multimedia format the receiving device can readily process.

Advantageously, the transmitting mobile device sends multimedia data in a single data format regardless whether the receiving mobile devices may use it immediately or only after it is transcoded into a preferred secondary or alternate format. This allows the transmitting mobile device to send multimedia data in a prima format to multiple receiving mobile devices without concern how or when the multimedia data may be transcoded into one or multiple different secondary formats. This also allows compatibility with future multimedia formats as implementations of the present invention not only identify a primary format of the multimedia data being transmitted but also determine and transcode into the secondary format of the data the receiving mobile device is capable of processing.

Figure 12:
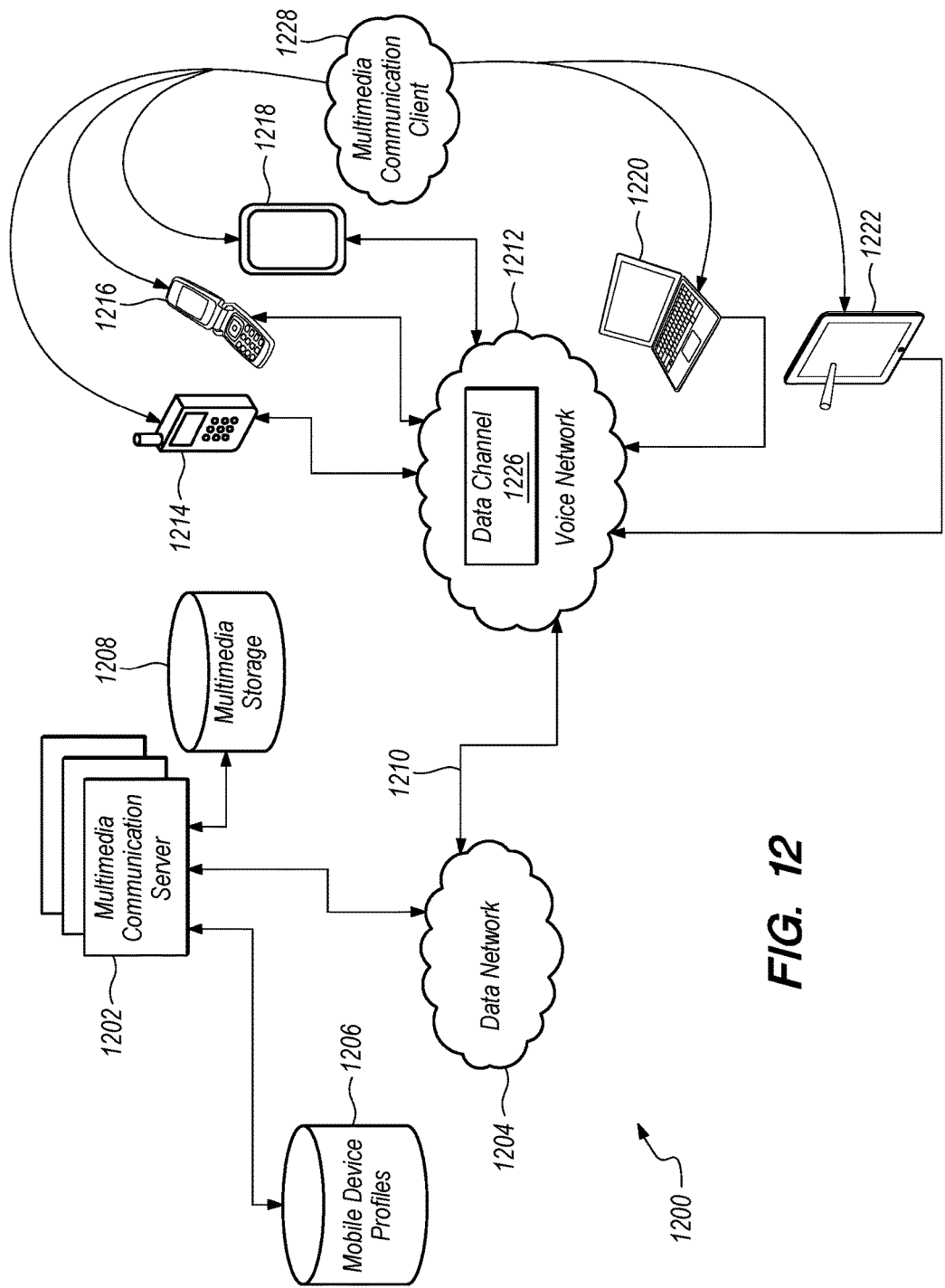
FIG. 12 is a block diagram illustrating a communication system for carrying multimedia data in accordance with implementations of the present invention.

FIG. 12 is a block diagram illustrating a communication system 1200 for carrying multimedia data in accordance with aspects of the present invention. In one implementation, communication system 1200 includes a multimedia communication server 1202 that exchanges multimedia data through a data network 1204 and a voice network 1212 over a communication bridge 1210. Multimedia communication server 1202 further has access to mobile device profiles 1206 and multimedia storage 1208 for storing multimedia data in one or more different formats.

Mobile device profiles 1206 may include specifications and capabilities for different models of mobile devices supported by communication system 1200. For example, the specification for a mobile device may include default display resolution, display size, communication bandwidth, a mobile identifier such as a phone number, internal memory and storage capacity, multimedia data processing capabilities, default language, locale and other settings associated with particular model of the mobile device.

Mobile devices registered with multimedia communication server 1202 may further specify preferences and customizations in mobile device profiles 1206. Each registered mobile device may specify certain preferences in the mobile device profile 1206 to be used with the mobile device. For example, a mobile device may be able to process multiple different multimedia formats however the user may prefer to see all videos in MPEG-4 or another preferred multimedia format. Customizations in mobile device profiles 1206 also tracks variations in both hardware and software for different releases or manufacturing runs of a mobile device. In some implementations, hardware variations in a later manufactured model of a mobile phone device may include a screen with a different resolution or display aspect ratio.

Multimedia storage 1208 includes storage devices, databases and systems for storing multimedia data in one or more different formats. In one implementation, multimedia storage 1208 stores multimedia data in a primary format associated with a transmitting mobile device. The transmitting mobile device sends the multimedia data in the primary format in the event the receiving mobile device is capable of processing the multimedia data in same format. For example, the transmitting mobile device and receiving mobile device may both use the multimedia video format of MPEG-4 for recording, storing and sending videos.

If the receiving mobile device uses a secondary format, aspects of the present invention then transcodes the multimedia data from the primary format into the secondary format as appropriate for the particular receiving mobile device. For example, multimedia communication server may transcode multimedia data in a primary format from a transmitting mobile device to a secondary format that a receiving mobile device can process. Transcoding involves a digital-to-digital conversion of data encoded in one format into another encoded digital format. In some implementations, transcoding is usually done in two steps: first, the multimedia data in the primary format is decoded and converted to an intermediary format. Next, the multimedia data in the intermediary format is encoded and converted to the target or secondary format.

Once transcoded, the multimedia data in the secondary format is stored on multimedia storage 1208 for the receiving mobile device as well as other mobile device that might need the same secondary format. Accordingly, multimedia storage 1208 is not limited to storing the multimedia data in one primary format or one secondary format but may include multiple different formats of the multimedia data a needed by the transmitting and receiving mobile devices.

In the example communication system 1200 in FIG. 12, multimedia communication server 1202 exchanges the multimedia data over data network 1204 to one or more mobile devices associated with voice network 1212. In one implementation, data network 1204 may include a combination of one or more networks including the Internet or an intranet within a business or company. Communication bridge 1210 facilitates connecting mobile devices on voice network 1212 to data network 1204 and then to the Internet or Intranet.

A wireless carrier providing voice network 1212 facilitates the exchange of voice of communication among mobile devices in addition to the exchange of multimedia data in accordance with the present invention. Each mobile device on voice network 1212 is provisioned—typically by the wireless carrier—with a phone number that operates as a mobile identifier. Implementations of the present invention use these mobile identifiers to help coordinate the exchange of multimedia data between mobile devices and may use one or more different wireless protocols in voice network 1212. Wireless carriers implementing wireless protocols in voice network 1212 may include Global System for Mobile (GSM), Code Division Multiple Access (CDMA) as well as many other derivatives and variants of these protocols.

In the exemplary voice network 1212 in FIG. 1, mobile devices may include a smartphone 1214, a conventional mobile phone 1216 (also referred to as a "feature phone"), a tablet computer 1218, a netbook 1220 and a smartbook 122. Each of the mobile devices on voice network 1212 have a wireless connection to voice network 1212, data to network 1204 and the Internet directly or over bridge 1210. As previously described, each mobile device is provisioned with a mobile identifier—such as a phone number—that identifies each device and allows for the exchange of multimedia data as well as voice communication between the mobile devices.

Generally, it is presumed that mobile devices used on voice network 1212 may have different hardware capabilities and software requirements depending on the different target markets. For example, smartphone 1214, such as the iPhone® (iPhone is a trademark of Apple, Inc.), provides voice communication and generally include one or more cores or processors for executing applications or "apps" that display images and videos on a relatively large high resolution screen. Conventional mobile phone 1216 display images and videos using a lower resolution display, a less powerful processor, less memory and lower in cost. In comparison, a tablet computer 1218 like the iPad® (iPad is a trademark of Apple, Inc.) generally has a large touch screen display used to manipulate data on the tablet computer for gaming and reading. Netbook 1220 has features of a general purpose laptop computer with built-in wireless modems for connecting to voice network 1212 or other local area networks using Wi-Fi. Smartbooks 1222 have features of a mobile phone device with lower power consuming processors and electronics but may also perform some general computing functions. Further, mobile devices may be a mobile music and multimedia player device like an iPod® (iPod is a trademark of Apple, Inc. of Cupertino, Calif.) or Zune® (tune is a trademark of Microsoft, Inc. of Redmond Wash.) provided the devices have some wireless connectivity options. Indeed, voice network 1212 and data network 1204 may support a variety of other mobile devices and thus the aforementioned mobile devices are not meant to be limiting in any way but illustrative of the wide range of mobile devices to benefit from implementations of the present invention. Accordingly, references to a mobile device or mobile devices includes the aforementioned mobile devices as well as any other mobile device provisioned with a mobile identifier such as a phone number and capable of implementing aspects of the present invention.

To exchange multimedia data, voice network 1212 incorporates messaging services through a data channel 1226 portion of voice network 1212. Mobile devices registered on the voice network 1212 use multimedia communication client 1228 to manage the messaging and the exchange of multimedia data in accordance with the present invention. Multimedia client 1228 executes on one or more of the mobile devices and interacts with multimedia communication server 1202 of the present invention. In one implementation, multimedia communication client 1228 uses conventional messaging protocols such as SMS (short messaging service) and multimedia messaging service (MMS). SMS messages are used to communicate approximately 1228 to 160 characters between multimedia communication clients 1228 and multimedia communication server 1202. Larger amounts of data including multimedia data may be transmitted using the MMS protocol. The MMS protocol is an improvement over the limitations of the SMS text protocol as it allows mobile devices to exchange larger amounts of multimedia content over data channel 1226 and voice network 1212.

Instead of SMS or MMS messaging, an alternate implementation of multimedia communication client 1228 may use messaging services provided through a synthetic communication network described in pending U.S. application Ser. No. 12/732,182 assigned to the assignee of the present invention and filed Mar. 25, 2010 entitled "Synthetic Communication Network Method and System" incorporated by reference herein for all purposes. The synthetic communication network bypasses data channel 1226 and creates a messaging service directly over data network 1204. For example, the synthetic communication network may use XMPP or SIMPLE messaging protocols for messages. In accordance with some implementations, synthetic communication network may also send larger text and multimedia messages as the messages avoid data channel 1226 and therefore not constrained by a fixed character limit.

Mobile devices accessing data network 1204 and messaging services provided by the synthetic communication network rely upon the data plan services offered through a service provider of voice network 1212. The mobile identifier used to identify each mobile device on the synthetic communication network is essentially the same as the phone number provisioned on voice network 1212. Some implementations access data network 1204 and the Internet using data incorporating technologies such as Enhanced Data Rates from GSM Evolution (EDGE), Universal Mobile Telephone Standard (UMTS), High Speed Downlink Packet Access (HSDPA) and Evolution Data Optimized (EVDO). Alternatively, mobile devices may also access directly access data network 1204 and the Internet using other wireless technologies such as WiMax, WiFi 802.11a/b/c/n/x or other similar protocols.

Figure 13:
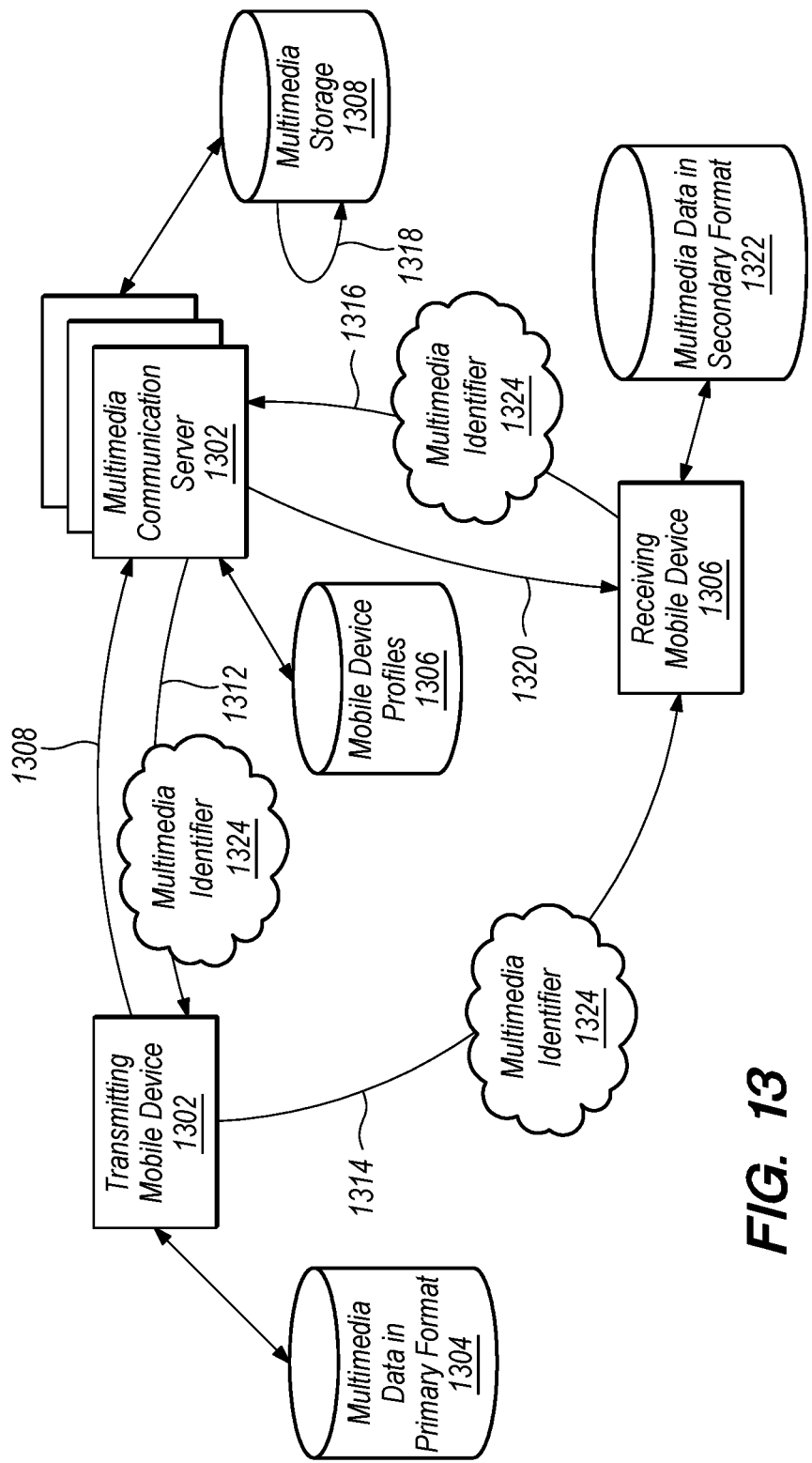
FIG. 13 is a schematic diagram illustrating the overall operations associated with processing multimedia data in accordance with implementations of the present invention.

FIG. 13 is a schematic diagram illustrating the overall operations associated with processing multimedia data in accordance with one implementation. This example schematic diagram includes a transmitting mobile device 1302, multimedia data in a primary multimedia format 1304, a receiving mobile device 1306, multimedia data in a secondary format 1322, a multimedia communication server 1202, mobile device profiles 1206, multimedia storage 1208, and multimedia identifier 1324.

In operation, transmitting mobile device 1302 attempts to send multimedia data in primary format 1304 to receiving mobile device 1306. Instead of sending directly to receiving mobile device 1306, multimedia data in primary format 1304 is uploaded (1308) to multimedia communication server 1202 over one or more networks. For example, transmitting mobile device 1302 may send multimedia data in primary format 1304 over a voice network, a bridge to a data network and then to multimedia communication server 1202

Multimedia communication server 1202 stores the multimedia data in the primary format 1304 on multimedia storage 1208. To track the multimedia data, multimedia communication server 1202 associates the multimedia data in primary format 1304 with multimedia identifier 1324. In some implementations, multimedia identifier 1324 can be a 128-bit value capable of individually identifying a specific multimedia data stored on multimedia storage 1208.

Next, multimedia communication server 1202 downloads the multimedia identifier 1324 to the transmitting mobile device 1302 (1312). Transmitting mobile device 1302 uses the multimedia identifier 1324 to reference multimedia data stored on multimedia storage 1208 in primary format 1304. Transmitting mobile device 1302 may then send a message containing the multimedia identifier 1324 (1314) to the receiving mobile device 1306. For example, the multimedia identifier 1324 may be sent using SMS, MMS or a message on the aforementioned synthetic network described in U.S. patent application Ser. No. 12/732,182, entitled "Synthetic Communication Network Method and Systems". The transmitting mobile device 1302 addresses the receiving mobile device 1306 using a mobile identifier such as a phone number. In one implementation, transmitting mobile device 1302 may further forward an HTTP or secure HTTP (i.e., HTTPS) link referencing the location of multimedia communication server 1202 on the Internet in addition to multimedia identifier 1324. Indeed while FIG. 13 illustrates only one receiving mobile device 1306, transmitting mobile device 1302 may transmit multimedia identifier 1324 and an HTTP or HTTPS link to more than one receiving mobile device using a multicast or similar protocol if the multimedia data is to be distributed to multiple mobile devices.

To obtain the multimedia data receiving mobile device 1306 contacts multimedia communication server 1202 and requests the multimedia data referenced by the multimedia identifier 1324 (1316). For example, receiving mobile device 1306 may reference either an HTTP or HTTPS link to first locate multimedia communication server 1202 on the Internet and then use multimedia identifier 1324 to Identify the multimedia data stored on, or associated with the communication server 1202.

Multimedia communication server 1202 transcodes the multimedia data in the primary format 1304 into a secondary format (1318) as appropriate for each receiving mobile device 1306. In one implementation, multimedia communication server 1202 may reference mobile device profiles 1206 to identify the secondary format used by the receiving mobile device 1306. Once transcoded, receiving mobile device 1306 receives the multimedia data in secondary format 1322 (1320) as illustrated in FIG. 13.

Figure 14:
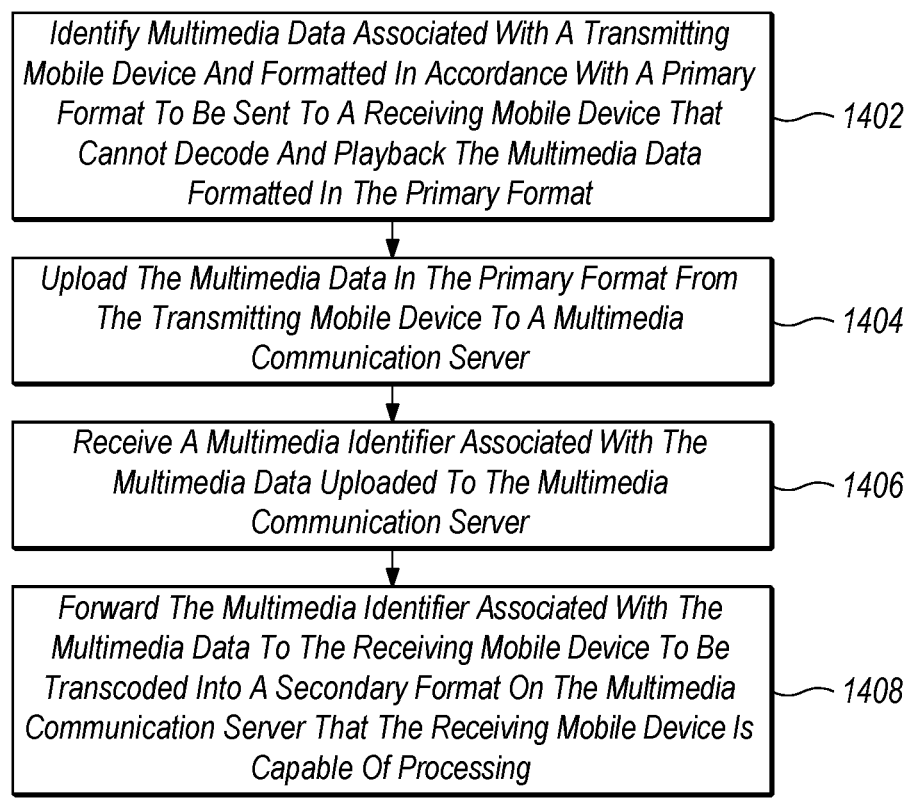
FIG. 14 is a flowchart diagram of the operations used by a transmitting mobile device sending multimedia data in a primary format in accordance with implementations of the present invention.

FIG. 14 is a flowchart diagram of the operations used by a transmitting mobile device sending multimedia data formatted in accordance with a primary format. Initially, a transmitting mobile device identifies multimedia data to be transmitted to a receiving mobile device. In one implementation, the transmitting mobile device specifies the receiving mobile device on a voice network using a phone number or other mobile identifier associated with the receiving mobile device. In accordance with one implementation, the receiving mobile device may not be able to decode and playback the multimedia data formatted in the primary format (1402). For example, a video taken with a camera on a transmitting mobile device may be formatted in a video format such as MPEG-4 that the receiving mobile device cannot decode or playback as it lacks the proper codec, software, or other drivers.

Instead of sending the multimedia data directly to the receiving mobile device, the transmitting mobile device uploads the multimedia data in the primary format to a multimedia communication server (1404). For example, the multimedia data in the primary format may be uploaded to the multimedia communication server embedded within or through an MMS message or other message type over the synthetic communication network as previously described. The multimedia communication server stores the multimedia data in the primary format and also generates a multimedia identifier for referencing the multimedia data in the primary format. Both the transmitting mobile device and the receiving mobile may use the multimedia identifier to reference the multimedia data in the primary format as it is stored on the multimedia communication server.

Accordingly, the transmitting mobile device then receives the multimedia identifier associated with the multimedia data in the primary format (1406). In some implementations, the multimedia communication server sends the multimedia identifier to the transmitting mobile device using a messaging protocol and message, for example, such as an SMS text message, an MMS message, or as other type of message using the aforementioned synthetic network. Additional descriptive information and a thumbnail image associated with the multimedia data may also be provided with this message to the transmitting mobile device, this can be used to confirm indirectly that the multimedia communication server as successfully received and processed the multimedia data. For example, a still image taken from a video and a title or caption associated with the video contents may also be provided from the multimedia communication server to the transmitting mobile device.

Next, the transmitting mobile device forwards the multimedia identifier associated with the multimedia data to the receiving mobile device. The multimedia identifier facilitates transcoding the multimedia data into a secondary format the receiving mobile device can process (1408). Since the secondary format used by the receiving mobile device is typically unknown, the multimedia communication server defers performing the transcoding until the multimedia data is requested. In some implementations, the server transcodes the multimedia data from the primary format into the secondary format when the receiving mobile device demands the multimedia data using the multimedia identifier. In this manner, implementations of the present invention offload transcoding of multimedia data from the primary format into the secondary format into the "cloud" by way of the multimedia communication server. When the demand for the multimedia data does not explicitly specify the secondary format, multimedia communication server may determine the appropriate secondary format through a query of a mobile device profile associated with the receiving mobile device.

Figure 15:
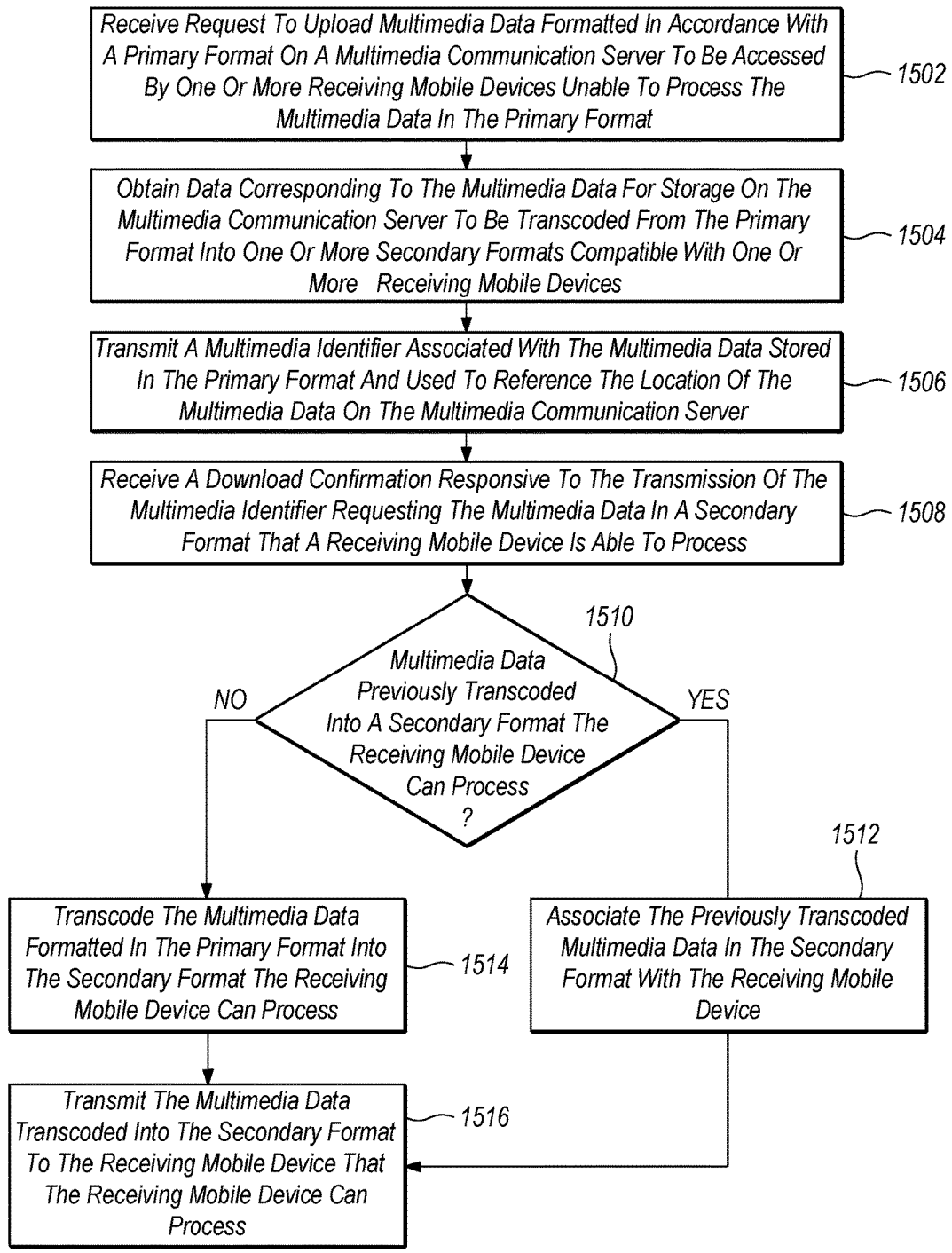
FIG. 15 is flowchart diagram illustrating the operations associated with processing multimedia data on a multimedia communication server in accordance with implementations of the present invention.

Referring to FIG. 15, a flowchart diagram illustrates the operations associated with processing multimedia data on a multimedia communication server in accordance with aspects of the present invention. In this example, implementations of the present invention initially receive a request to upload multimedia data formatted in accordance with a primary format (1502). Typically, the multimedia data is in a primary format that the transmitting mobile device can process but the receiving mobile device is unable to process. For example, one or more receiving mobile devices may not have the proper coders or decoders to decode the multimedia data in the primary multimedia format, such as a video formatted in MPEG-4 or other video format.

Next, the multimedia communication server obtains data corresponding to the multimedia data in a primary format for storage on the multimedia communication server (1504). For example, the multimedia communication server may obtain the data for the multimedia data from the transmitting mobile from an MMS message, a streaming protocol, a file transfer protocol, a message over the aforementioned synthetic communication network or other data transfer methods. The multimedia communication server stores the multimedia data in the primary format and prepares for transcoding the multimedia data into one or more secondary formats on demand as the requests from one or more receiving mobile devices are made.

In one implementation, multimedia communication server may also receive metadata with further details on the transmitting mobile device, receiving mobile devices, and the multimedia data. Metadata associated with the transmitting and receiving mobile devices may include a phone number or other mobile identifier, a display resolution, a display size, a make and model of the mobile device, and a multimedia format each of the mobile devices are capable of processing. In some implementations, metadata describing the mobile devices and multimedia data may be included in the multimedia data and sent directly to the multimedia storage server. Alternatively, some metadata may be stored in a database such as mobile device profiles 1206 in FIG. 12 and referenced using a phone number or other mobile identifier associated with either a transmitting or receiving mobile device.

Next, implementations of the present invention transmit a multimedia identifier associated with the multimedia data stored in the primary format on the multimedia communication server (1506). This multimedia identifier is used by one or more receiving mobile devices to identify and request the multimedia content in the proper format with a value that references a storage location on the multimedia communication server. In some implementations, the value used for the multimedia identifier may be randomly generated and cross-referenced with a storage location in a look-up table on the multimedia communication server. Alternatively, the multimedia identifier value may be combination of values that reference a specific storage device, a filesystem, and file in the filesystem associated with the multimedia communication server. If multiple clusters of storage devices are used, the multimedia identifier value may also be constructed using a reference to the particular storage device cluster where the storage device is located.

Multimedia communication server may delay the process of transcoding between a primary format and a secondary format of the multimedia data until a receiving mobile device makes a request. Accordingly, multimedia communication server receives a download confirmation when a receiving mobile device makes a request for the multimedia data in a secondary format (1508). For example, the download confirmation may be sent by a receiving mobile device in response to the transmission of the multimedia identifier. The download confirmation requests the multimedia data in a secondary format that the receiving mobile device is able to process. To facilitate the request, the download confirmation may include a phone number or other mobile identifier used to access a mobile device profile of the receiving mobile device. Using this phone number, the multimedia communication server may access the corresponding mobile device profile and determine the multimedia data format preferred by the receiving mobile device. In turn, multimedia communication servers may also notify the transmitting mobile device that the multimedia identifier has been successfully received by the receiving mobile device and the transcoding process has been initiated in the background.

Aspects of the present invention may then determine if the multimedia data had been previously transcoded into the secondary format used by the receiving mobile device (1510). In some cases, the multimedia communication server has already transcoded the multimedia data for another receiving mobile device and the transcoded multimedia data can be reused. For example, a transmitting mobile device may send multimedia data to two or more receiving mobile devices that use the same secondary format for the multimedia data. In this case, the multimedia communication server transcodes and stores the multimedia data into the secondary format upon demand by the first receiving mobile device which is then reused by the second receiving mobile device.

Accordingly, if the multimedia data is In the secondary format (1510—Yes) then aspects of the present invention associate the previously transcoded multimedia data in the secondary format with at least one receiving mobile device (1512). In one implementation, the multimedia communication server updates a database that cross references a phone number or other mobile identifier of the receiving mobile device with the storage location of the multimedia data in the secondary format.

Next, the multimedia communication server sends the receiving mobile device the multimedia data transcoded into the secondary format that receiving mobile device can process (1516). For example, the multimedia communication server may send the multimedia data to the receiving mobile device as part of an MMS message or another type of message using the aforementioned synthetic communication network.

Alternatively, when the multimedia data is not available in the secondary format (1510—No) aspects of the present invention transcode the multimedia data formatted in the primary format into the secondary format the receiving mobile device can process (1514). In one implementation, the multimedia communication server is configured with multimedia software and/or hardware to transcode the multimedia data between the primary format and the secondary format. Once the multimedia data has been transcoded, implementations of the present invention send the transcoded multimedia data in the secondary format to the receiving mobile device that can be readily processed (1516). For example, the receiving mobile device may decode and playback a video in the secondary format displaying the images and broadcasting the corresponding sound.

Figure 16:
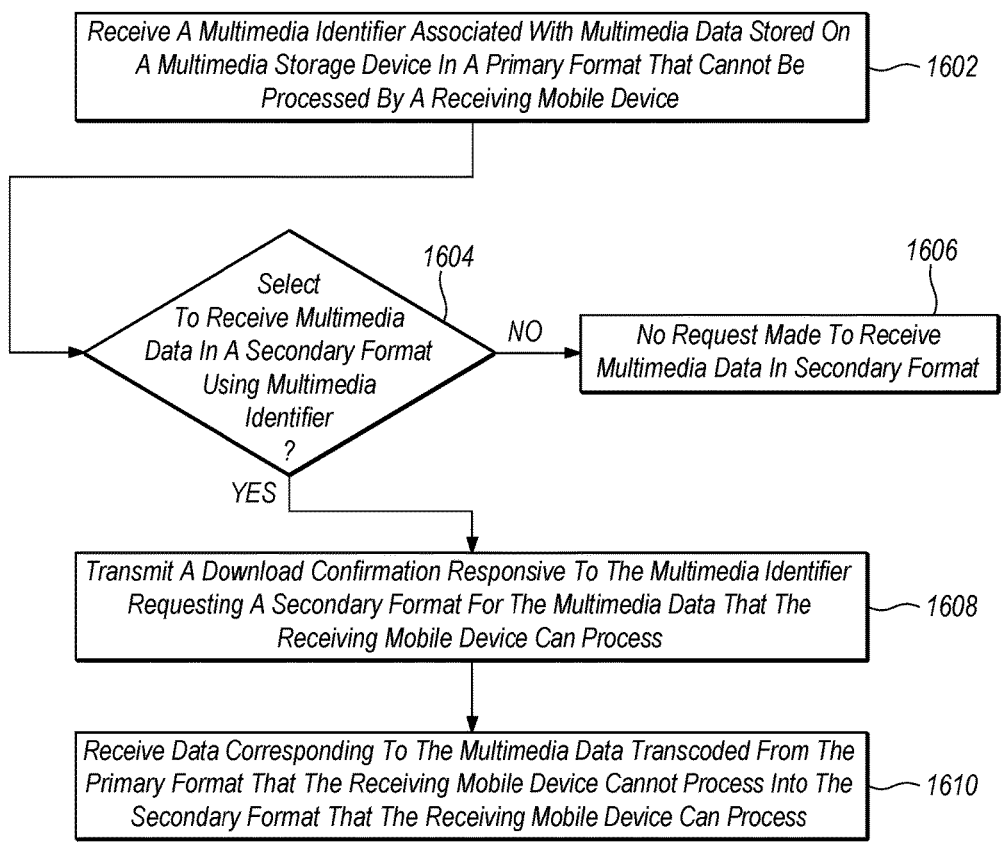
FIG. 16 is a flowchart diagram of the operations that a receiving mobile device uses to process multimedia data in accordance with implementations of the present invention.

FIG. 16 is a flowchart diagram of the operations that a receiving mobile device uses to process multimedia data in accordance with the present invention. In one implementation, the receiving mobile device receives a multimedia identifier associated with multimedia data stored on a multimedia communication server (1602). For example, the receiving mobile device may receive the multimedia identifier in an SMS text message, an MMS message or a message from the aforementioned synthetic communication network. Often, the multimedia identifier references multimedia data stored in a primary format that the receiving mobile device is not capable of processing. As previously described, the receiving mobile device may lack the proper software and/or hardware with compatible codecs or decoders to process multimedia data such as a video encoded in MPEG-4.

In one implementation, the receiving mobile device uses the multimedia identifier and selects to receive the multimedia data in a secondary format (1604—Yes). For example, the receiving mobile device may select an HTTP link and multimedia identifier sent in an SMS text message to the receiving mobile device.

Alternatively, the receiving mobile device may not select to receive the multimedia data (1604—No). In some cases, the receiving mobile device may receive a multimedia identifier yet decide not to receive the associated multimedia data if the data is not wanted. If this occurs, implementations of the present invention on the receiving mobile device do not demand or request the multimedia data in the secondary format (1606). Consequently, a multimedia communication server would also not transcode the data into the secondary format compatible with the receiving mobile device but instead leave the multimedia data in the primary format or other existing formats.

Alternatively, one implementation transmits a download confirmation to the multimedia storage server and thereby demands transcoding for at least the receiving mobile device. Sending the download confirmation effectively requests that the multimedia communication server download, and transcode as necessary, the multimedia data in the secondary format to the receiving mobile device (1608). One implementation of this download confirmation may further include a mobile identifier for the mobile device also used for referencing the mobile device's preferences and settings stored in a database such as mobile device profiles 1206 in FIG. 12. This information is useful to the multimedia communication server when transcoding from a primary format of the multimedia data into a secondary format of the multimedia data beneficial to the processing on the receiving mobile device.

Next, the receiving mobile device receives the data corresponding to the multimedia data formatted in the secondary format. In one implementation, the multimedia communication server transcodes the multimedia data from the primary format the receiving mobile device cannot process into the secondary format that the receiving mobile device can process (1610). For example, the multimedia communication server may transcode a video originally formatted in a primary format such as MPEG-4 into a secondary format used for video such an AVI format.

Figure 17:
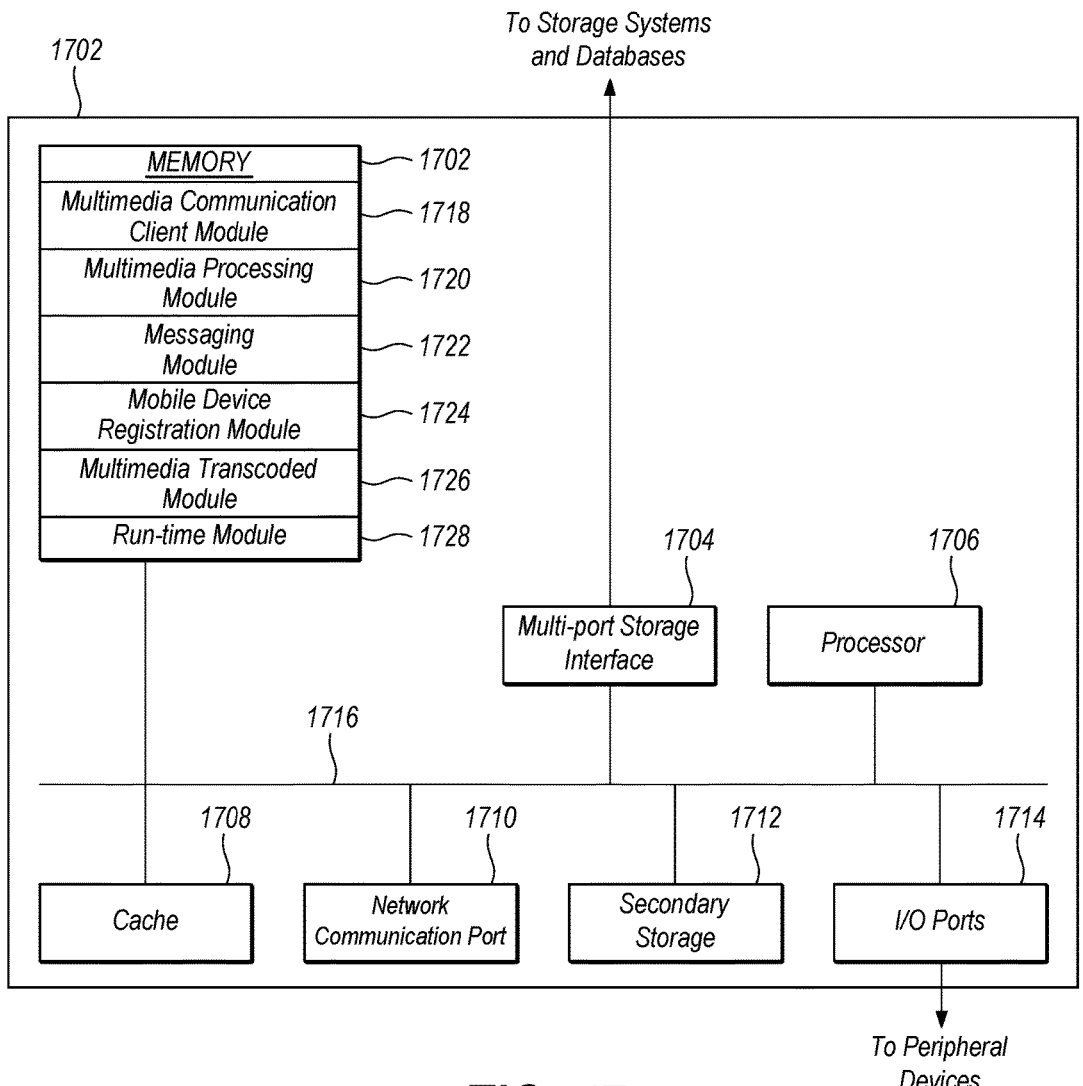
FIG. 17 is a block diagram of a multimedia communication server apparatus used in implementations of the present invention.

FIG. 17 is a block diagram of a multimedia communication server 1202 apparatus used in one implementation for performing one or more methods of the present invention. Server 1202 may include a memory 121802 to hold executing programs (typically random access memory (RAM) or writable read-only memory (ROM) such as a flash ROM), a multiport storage interface 1704, a processor 1706 for executing instructions, a cache 1708 for holding codes, drivers, or other frequently used programs, a network communication port 1710 for data communication, a secondary storage 1712 with secondary storage controller for backup and high-availability, and input/output (I/O) ports 1714 all operatively coupled together over an interconnect 1716.

Multimedia communication server 1202 may be implemented using a mainframe computer, a cluster of computers, a personal computer or a server appliance. In addition, multimedia communication server 1202 can be preprogrammed, for example, using field-programmable gate array (FPGA) technology, ROM or it can be programmed (and reprogrammed) by loading a program from a computer readable medium. For example, executable instructions in memory 121802 may also be loaded from a hard drive, a thumb-drive, a DVD, a CD-ROM or other computer readable medium in preparation for execution on processor 1706. Also, multimedia communication server 1202 can also be implemented using one or more customized application specific integrated circuits (ASICs).

In one implementation, processor 1706 executes instructions in memory 121802 selected from one or more modules including a multimedia communication client module 1718, multimedia processing module 1720, messaging module 1722, mobile device registration module 1724, multimedia transcoding module 1726, and run-time module 1728 that manages system resources used when processing one or more of the above components on multimedia communication server 1202.

Multimedia communication client module 1718 facilitates an exchange of multimedia data between a transmitting device and a receiving device in accordance with aspects of the present invention. In one implementation, multimedia communication client module 1718 is downloaded from multimedia communication server 1202 onto each respective transmitting and receiving mobile device. Alternatively, one or more instances of multimedia communication client module 1718 execute on multimedia communication server 1202 in a "cloud" and are delivered to both transmitting and receiving mobile devices as software as a service (SaaS).

On the transmitting mobile device, multimedia communication client module 1718 sends multimedia data from the transmitting mobile device to a receiving mobile device in accordance with the present invention. Another instance of multimedia communication client 1718 associated with the receiving mobile device receives and processes the multimedia data in accordance with the present invention.

In one implementation, multimedia processing module 1720 receives and stores multimedia data on the multimedia communication server 1202. In addition, multimedia processing module 1720 generates a multimedia identifier that references the location of the multimedia data on the multimedia communication server. Multimedia processing module 1720 may also store metadata describing the multimedia content, the transmitting mobile device, the receiving mobile device or devices and any other information that help with the delivery and processing of multimedia content in accordance with the present invention.

Messaging module 1722 processes messages for communicating with both the transmitting mobile device, the receiving mobile device and other systems used in accordance with the present invention. For example, messaging module may deliver messages using SMS, MMS, SIMPLE, XMPP and other protocols capable of delivering messages with text or multimedia, or both. In one implementation, messaging module 1722 sends messages over a synthetic communication network described in U.S. patent application Ser. No. 12/732,182, titled "Synthetic Communication Network Method and System".

Mobile device registration module 1724 gathers information on mobile devices and creates corresponding mobile device profiles. Each mobile device profile includes details on the mobile device including a preferred format for multimedia data that the mobile device is capable of processing. Other information may further include the mobile device screen dimensions and resolution, sound reproduction capabilities, available memory on each mobile device, and other information relevant to processing multimedia data on the mobile device. These mobile device profiles may be stored in a mobile device profiles database such as mobile device profiles 1206 in FIG. 12.

Multimedia transcoding module 1726 converts multimedia data from a primary format into a secondary format in accordance with implementations of the present invention. For example, the primary format and secondary format for video multimedia data may be selected from a set of video formats including: H.261, H.263, H.264, M-JPEG, MPEG-1, MPEG-2, MPEG-4, AV1, Ogg, Theora, VC-1 as well as derivatives and combinations these types. In another implementation, the primary format and secondary format for sound multimedia data may be selected from a set of sound formats including: way, ogg, mpc, flac, TTA, aiff, raw, au, gsm, dct, vox, mmf, mp3, aac, mp4, wma, atrac, ra, rm, ram, dss, msv, dvf, IVS, m4p, iklax, mxp4, 3gp, amr, and awb as well as derivatives and combinations these types. In yet another implementation, the primary format and secondary format for image multimedia data may be selected from a set of image formats including: JPEG/JFIF, JPEG 2000, Exif, TIFF, RAW, PNG, GIF, BMP, PPM, PGM, PBM, PNM, WEBP, CGM, SVG, PNS, JPS and MPO as well as derivatives and combinations these types.

Figure 18:
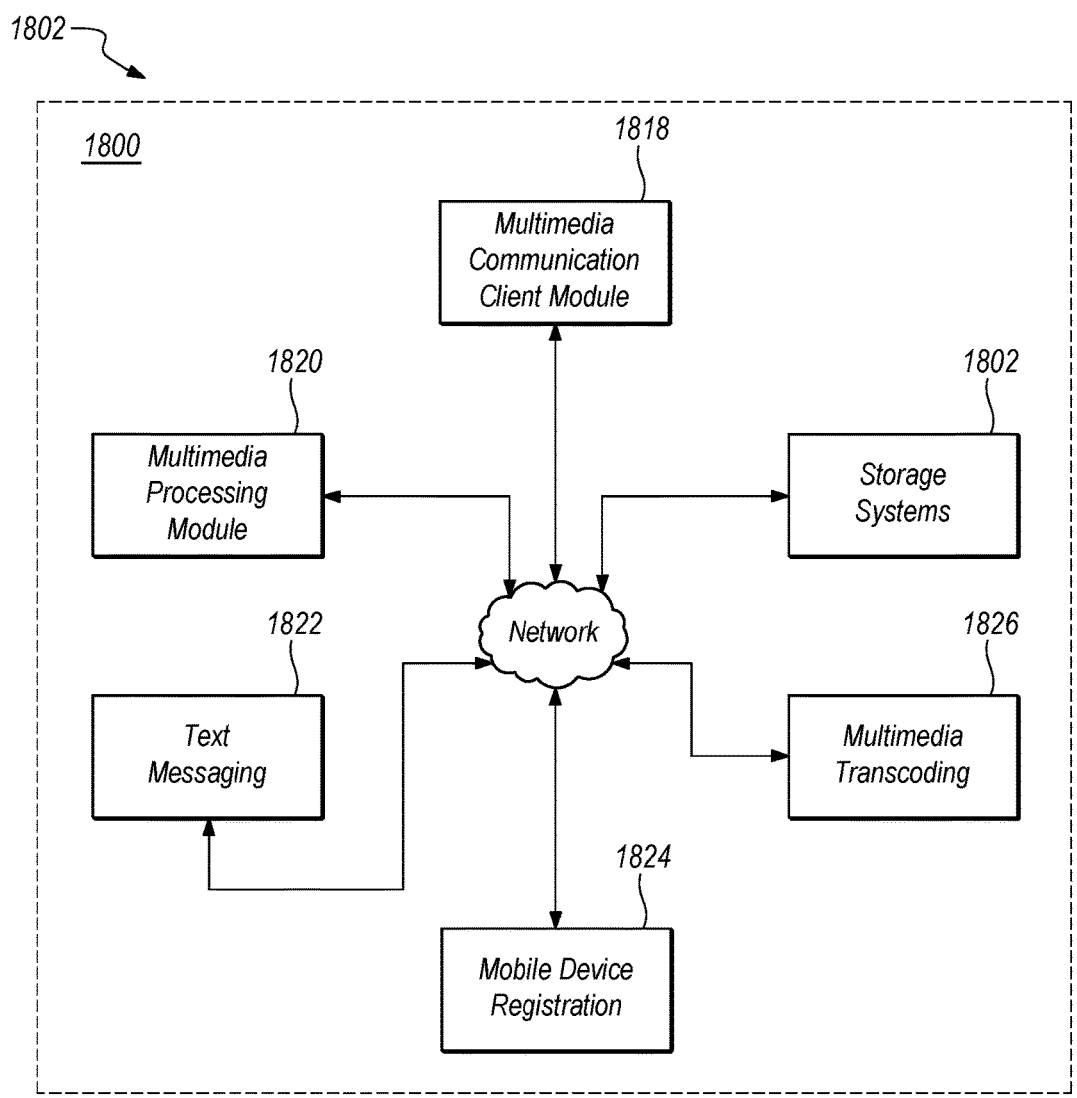
FIG. 18 is a block diagram illustrating a cluster of computers implementing multimedia communication functions in accordance with the implementations of the present invention.

An alternate implementation of multimedia communication server 1202 may separate the different functions used in implementing aspects of the present invention onto different computers within a cluster 1800 of computers as illustrated in FIG. 18. A cluster of computers advantageously improves scalability through better overall utilization of resources and increases reliability as it is less likely for multiple computers to fail simultaneously. For example, separate computer servers in cluster 1800 may each be configured to execute Multimedia Communication Client Module 1718, Multimedia Processing Module 1720, Text Messaging Module 1722, Mobile Device Registration Module 1722, Multimedia Transcoding Module 1724 and Storage Systems 1802 for storing multimedia data in one or more formats. Instead of separate computer servers, cluster 1800 may be implemented using virtualization technology to create separate virtualized computer servers for each different function in accordance with the present invention. In either implementation, the different computer servers in cluster 1800 in FIG. 18 function in a similar manner as the aforementioned corresponding modules described in conjunction with and illustrated in FIG. 17.

While examples and implementations have been described, they should not serve to limit any aspect of the present invention. Accordingly, implementations of the invention can be implemented in digital electronic circuitry, or in computer hardware, firmware, software, or in combinations of them. Implementations of the invention may further include a computer program product, comprising a machine usable medium having computer readable program code tangibly embodied therein. The computer readable program code in the computer program product performs implementations of the invention when executed by a programmable processor.

Aspects of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. In some implementations, multimedia data is described as being formatted according to one format or another format yet may also be organized according to a "container" type instead. Containers of data compatible with one container type may be converted from one container type to another container type. In some implementations, the "container" or "container file" may contain a single data type such as audio (e.g., AIFF, WAVE, XMF, or MP3), video, or multiple related data types concerning combinations thereof with audio and video (e.g., 3GP, ASE, AVI, DVR-MS, FLASH video, IFF, QuickTime File Format, MPEG program stream, MP4, and others), while in other implementations the "container file" may further include subtitles, chapter-information, and meta-data or tags for frames of data or subsets of the data along with synchronization information required to playback the streams of data together. Accordingly, the invention is not limited to the above-described implementations, but instead is defined by the appended claims in light of their full scope of equivalents.

We claim:

1. A method, comprising:
identifying, on a transmitting mobile device, multimedia data, formatted in accordance with a primary format, to be sent to a receiving mobile device that cannot process the multimedia data formatted in the primary format;
uploading the multimedia data, formatted in accordance with the primary format, to a multimedia communication server;
receiving at the transmitting mobile device from the multimedia communication server a multimedia identifier associated with the multimedia data uploaded to the multimedia communication server; and
transmitting the multimedia identifier, over a synthetic communications network, from the transmitting mobile device to the receiving mobile device, the multimedia identifier intended for use by the receiving mobile device to request the download to the receiving mobile device of the multimedia data in a transcoded secondary format that the receiving device can process, wherein the receiving mobile device is identified on the synthetic communications network by a phone number which, before transmission of the multimedia identifier, had been confirmed to be associated with the receiving mobile device as a result of receipt at the receiving mobile device of a verification message transmitted by the receiving mobile device and addressed to the phone number.

2. The method of claim 1, wherein the multimedia data is selected from a set of multimedia data types including images, videos, sound and combinations thereof.

3. The method of claim 1, further comprising the step of receiving at the transmitting mobile device from the multimedia server a message confirming receipt of the multimedia data by the receiving mobile device.

4. The method of claim 3, wherein the message confirming receipt of the multimedia data by the receiving mobile device is a thumbnail image derived from the multimedia data.

5. A method, comprising:
receiving at a multimedia communication server from a transmitting mobile device on a synthetic communications network multimedia data formatted in accordance with a primary format;
storing in association with the multimedia communications server the multimedia data in the primary format to be made available by the multimedia communication server for access by at least one receiving mobile device on the synthetic communications network in at least one of a plurality of secondary formats;
transmitting from the multimedia communication server to the transmitting mobile device a multimedia identifier associated with the multimedia data stored in the primary format, the transmitted multimedia identifier intended for use by the at least one receiving mobile device to reference the multimedia data stored in association with the multimedia communication server;
transcoding the multimedia data formatted in the primary format into at least one selected secondary format compatible with the at least one receiving mobile device; and
transmitting the transcoded multimedia data in the at least one selected secondary format to the at least one receiving mobile device, wherein the at least one receiving mobile device is identified on the synthetic communications network by a phone number which, before transmission of the transcoded multimedia data, had been confirmed to be associated with the receiving mobile device as a result of receipt at the receiving mobile device of a verification message transmitted by the receiving mobile device and addressed to the phone number.

6. The method of claim 5, wherein the at least one selected secondary format is identified in a profile of the at least one receiving mobile device as the format preferred by the user of the at least one receiving mobile device from among the plurality of secondary formats that are compatible with the at least one receiving mobile device.

7. The method of claim 5, further comprising the step of selecting the at least one secondary format, from a plurality of secondary formats that are compatible with the at least one receiving mobile device, which selected format is more efficient for the transmission of the multimedia data on the synthetic network than at least one of the other of the plurality of secondary formats.

8. The method of claim 5, further comprising the step of transmitting a download confirmation message to the transmitting mobile device responsive to the transmission of the transcoded multimedia data to the at least one receiving mobile device.

9. The method of claim 8, wherein the download confirmation message includes a thumbnail image derived from the multimedia data.

10. The method of claim 6, wherein the multimedia data is selected from a set of multimedia data types including images, videos, sound and combinations thereof.

11. The method of claim 7, wherein the multimedia data is selected from a set of multimedia data types including images, videos, sound and combinations thereof.

12. A transmitting mobile device, comprising:
a processor that executes instructions; and
a memory having instructions when executed on the processor that cause the transmitting mobile device to identify multimedia data, formatted in accordance with a primary format, for transmission to a receiving mobile device that cannot process the multimedia data formatted in the primary format, upload the multimedia data, formatted in accordance with the primary format, to a multimedia communication server, receive a multimedia identifier associated with the multimedia data uploaded to the multimedia communication server, and transmit the multimedia identifier, over a synthetic communications network, from the transmitting mobile device to the receiving mobile device, the multimedia identifier intended for use by the receiving mobile device to request the download to the receiving mobile device of the multimedia data transcoded into a secondary format that the receiving device can process, wherein the receiving mobile device is identified on the synthetic communications network by the transmitting mobile device using a phone number for the receiving mobile device which, before transmission of the multimedia identifier, had been confirmed to be associated with the receiving mobile device as a result of receipt at the receiving mobile device of a verification message transmitted by the receiving mobile device and addressed to the phone number.

13. The transmitting mobile device of claim 12, wherein the primary format and the secondary format are selected from a set of video formats including: H.261, H.263, H.264, M-JPEG, MPEG-1, MPEG-2, MPEG-4, Ogg, Theora, VC-1 and derivatives and combinations of these formats.

14. The transmitting mobile device of claim 12, wherein the multimedia data is selected from a set of multimedia data types including images, videos, sound and combinations thereof.

15. A multimedia communications server, comprising:
a processor that executes instructions; and
a memory having instructions when executed on the processor that enables the multimedia communications server to receive from a transmitting mobile device on a synthetic communications network multimedia data formatted in accordance with a primary format, store the multimedia data in the primary format for access by at least one receiving mobile device on the synthetic communications network in at least one of a plurality of secondary formats, responsive to receiving the multimedia data, transmit to the transmitting mobile device a multimedia identifier associated with the multimedia data, the transmitted multimedia identifier intended for use by the at least one receiving mobile device to reference the stored multimedia data, transcode the multimedia data formatted in the primary format into at least one selected secondary format compatible with the at least one receiving mobile device, and transmit the transcoded multimedia data in the at least one selected secondary format to the at least one receiving mobile device, wherein the at least one receiving mobile device is identified by the multimedia communications server on the synthetic communications network by a phone number which, before transmission of the transcoded multimedia data, had been confirmed to be associated with the receiving mobile device as a result of receipt at the receiving mobile device of a verification message transmitted by the receiving mobile device and addressed to the phone number.

16. The multimedia communications server of claim 15, wherein the at least one selected secondary format is identified in a profile of the at least one receiving mobile device as the format preferred by the user of the at least one receiving mobile device from among the plurality of secondary formats that are compatible with the at least one receiving mobile device.

17. The multimedia communications server of claim 15, wherein the instructions enable the multimedia communications server to select the at least one selected secondary format from the plurality of the secondary formats that are compatible with the at least one receiving mobile device, which at least one selected secondary format is more efficient for the transmission of the multimedia data on the synthetic network than at least one of the other of the at least one secondary formats.

18. The multimedia communications server of claim 15, further comprising instructions in the memory that when executed on the processor cause the processor to transmit a download confirmation message to the transmitting mobile device responsive to the transmission of the transcoded multimedia data to the at least one receiving mobile device.

19. The multimedia communications server of claim 18, wherein the download confirmation message includes a thumbnail image derived from the multimedia data.

20. The multimedia communications server of claim 15, wherein the multimedia data is selected from a set of multimedia data types including images, videos, sound and combinations thereof.

* * * * *